(12) United States Patent  
Heyner et al.

(10) Patent No.: US 8,700,509 B2  
(45) Date of Patent: Apr. 15, 2014

(54) COLLECTIVELY ANALYZING HOLDINGS ACROSS MULTIPLE FIXED INCOME PRODUCTS

(75) Inventors: Mark A. Heyner, Golden, CO (US); Thomas C. Knight, San Ramon, CA (US); Dai Zhao, Chapel Hill, NC (US); Victor James Hazard, IV, Palos Verdes Peninsula, CA (US); Sebastian Ramos, San Francisco, CA (US)

(73) Assignee: Institutional Cash Distributors Technology, LLC, Palos Verdes Estates, CA (US)

( * ) Notice: Subject to any disclaimer, the term of this patent is extended or adjusted under 35 U.S.C. 154(b) by 235 days.

(21) Appl. No.: 13/156,234

(22) Filed: Jun. 8, 2011

(65) Prior Publication Data

US 2012/0317052 A1  Dec. 13, 2012

(51) Int. Cl.  
*G06Q 40/00* (2012.01)

(52) U.S. Cl.  
USPC .......................................................... 705/35

(58) Field of Classification Search  
CPC ........ G06Q 40/00; G06Q 20/29; G06Q 20/22  
USPC ..................... 715/1–18; 705/1–130; 709/1–80  
See application file for complete search history.

(56) References Cited

U.S. PATENT DOCUMENTS

| 2002/0188544 A1 | 12/2002 | Wizon et al. |
| 2004/0103050 A1 | 5/2004 | Long |
| 2010/0250467 A1* | 9/2010 | Weinstein et al. .......... 705/36 R |

FOREIGN PATENT DOCUMENTS

| JP | 2004005626 | 1/2004 |
| JP | 2005321982 | 11/2005 |
| KR | 10-2010-0028788 | 3/2010 |

OTHER PUBLICATIONS

Theodore M. Barnhill Jr. & William F. Maxwell, Modeling correlated market and credit risk in fixed income portfolios, 2002, Journal of Banking and finance, 1-28.*

* cited by examiner

*Primary Examiner* — Marissa Liu  
(74) *Attorney, Agent, or Firm* — Marsh Fischmann & Breyfogle LLP; Kent A. Fischmann

(57) ABSTRACT

Systems, methods, and computer-readable mediums (i.e., utilities) for use in enabling corporate treasurers, money managers, and other investors to view and analyze consolidated credit risk on individual investments across multiple money market products (MMPs) and/or multiple accounts. In one aspect, the utilities may generate a database of MMP and related holding information that may be used to research and analyze one or more MMPs and/or underlying securities even if the same MMP or security is associated with different identifiers. In another aspect, the securities or holdings of the MMPs of actual or sample accounts may be aggregated (e.g., by common identifier, sponsor, issuer, etc.) either within MMPs and/or across multiple MMPs and subsequently analyzed to generate inferences and to obtain numerous types of information which may be presented to corporate treasurers and/or other users on a display (e.g., text, charts, graphs, etc.) for use in gauging a company's or other entity's credit exposure and in making decisions based on what is displayed.

22 Claims, 21 Drawing Sheets

| MMPS 200 | | | | | | | | |
|---|---|---|---|---|---|---|---|---|
| MMP NAME | NATIVE IDS | STD ID | HOLDING NAMES | SIZE (THOUSANDS OF USD) | YIELD | WAM | MMP CO | MMP PARENT |
| MMP 1 | NID1,NID2,NID3 | STD ID1 | H1,H2,H4,H5 | 40,000 | .11 | 35 | CO1 | PA1 |
| MMP 2 | NID4,NID5,NID6 | STD ID2 | H2,H4,H6 | 65,000 | .12 | 33 | CO2 | PA2 |
| MMP 3 | NID7,NID8,NID9 | STD ID3 | H6,H7,H8 | 50,000 | .15 | 47 | CO3 | PA3 |
| --- MMP N | | | | | | | | |

MMP 1 — HOLDINGS 300

| HOLDING NAME | NATIVE IDS | STD ID | TYPE | PAR (THOUSANDS OF USD) | %WEIGHT | MATURITY DATE | SPONSOR | ISSUER |
|---|---|---|---|---|---|---|---|---|
| H1 | ND12,ND14 | STD ID 100 | REPO | 157,000 | 10 | 01/13/12 | SP1 | IS1 |
| H2 | ND24,ND38 | STD ID 101 | ABCP | 110,000 | 40 | 06/12/11 | SP3 | IS2 |
| H4 | ND39,ND19 | STD ID 200 | REPO | 120,000 | 30 | 08/01/11 | SP1 | IS3 |
| H5 | ND41,ND99 | STD ID 201 | GOVT | 170,000 | 20 | 07/07/11 | SP4 | IS4 |

FIG.4

MMP 2 — HOLDINGS 400

| HOLDING NAME | NATIVE IDS | STD ID | TYPE | PAR (THOUSANDS OF USD) | %WEIGHT | MATURITY DATE | SPONSOR | ISSUER |
|---|---|---|---|---|---|---|---|---|
| H2 | ND24,ND38 | STD ID 101 | ABCP | 110,000 | 60 | 06/12/11 | SP3 | IS2 |
| H4 | ND39,ND19 | STD ID 200 | REPO | 120,000 | 10 | 08/01/11 | SP1 | IS3 |
| H6 | ND44,ND22 | STD ID 204 | REPO | 130,000 | 30 | 09/02/11 | SP1 | IS6 |

| CUSTOMER INFORMATION 600 | | |
|---|---|---|
| CUSTOMER ID | ACCOUNTS 608 | MMPS 612 |
| CUSTOMER 1 | ACCOUNT 1<br>ACCOUNT 2 | MMP1,MMP3,MMP6<br>MMP4,MMP6 |
| CUSTOMER 2 | ACCOUNT 3 | MMP3 |
| CUSTOMER 3 | ACCOUNT 4 | MMP1,MMP3,MMP3 |
| CUSTOMER n | | |

TRANSPARENCYPLUS

SECURITY SELECTION SERVICE WORLDWIDE

HOLDINGS | SEARCH | SPONSOR | USER PREFERENCES | TUTORIALS | LOG OUT

MAY 12, 2011 WELCOME

| GROUP SELECT | VIEW | AMOUNT | FUND NAME | BLOOMBERG TICKER | IQ TICKER | FUND CATEGORY | 1 DAY YIELD | 7 DAY YIELD | 30 DAY YIELD | AUM | WAM | FUND COMPANY | PARENT |
|---|---|---|---|---|---|---|---|---|---|---|---|---|---|
| ☐ | 🔍 | $0 | JPMORGAN LIQUID ASSETS MMFI/CAPITAL | CJLXX | CJLXX | GENERAL PURPOSE PRIME FUNDS | 0.10 | 0.11 | 0.12 | 10,526.7 | 53 | JPMORGAN LIQUID ASSETS MONEY MARKET FUND | JPMORGAN CHASE & CO |
| ☐ | 🔍 | $0 | MORGAN STANLEY ILF/MMP/INST | MPUXX | MPUXX | GENERAL PURPOSE PRIME FUNDS | 0.11 | 0.13 | 0.16 | 3,842.5 | 29 | MORGAN STANLEY INSTITUTIONAL LIQUIDITY FUNDS- MONEY MARKET PORTFOLIO | MORGAN STANLEY |
| ☐ | 🔍 | $0 | WELLS FARGO ADV CASH INV MMF/INST | WFIXX | WFIXX | GENERAL PURPOSE PRIME FUNDS | 0.06 | 0.08 | 0.09 | 19,381.4 | 25 | WELLS FARGO ADVANTAGE CASH INVESTMENT MONEY MARKET FUND | WELLS FARGO & CO |
| ☐ | 🔍 | $0 | WESTERN ASSET INST LIQ RES/INST | CILXX | CILXX | GENERAL PURPOSE PRIME FUNDS | 0.17 | 0.18 | 0.19 | 31,642.4 | 56 | WESTERN ASSET INSTITUTIONAL LIQUID RESERVES | LEGG MASON INC |
| ☐ | 🔍 | $0 | AMER BEACON US GOVT MM SELECT | AAOXX | AAOXX | GOVT/TREASURY/ REPO FUNDS | 0.01 | 0.01 | 0.02 | 520.5 | 9 | AMERICAN BEACON US GOVERNMENT MONEY MARKET FUND | PHAROS CAPITAL GROUP LLC |
| ☐ | 🔍 | $0 | BARCLAYS BGI GOVT MMFIC | BGGXX | BGGXX | GOVT/TREASURY/ REPO FUNDS | 0.00 | 0.00 | 0.00 | 288.4 | 1 | BLACKROCK CASH FUNDS: GOVERNMENT | BLACKROCK INC |
| ☐ | 🔍 | $0 | BLACKROCK CASH FUNDS: TREASURY/C | BCYXX | BCYXX | GOVT/TREASURY/ REPO FUNDS | 0.00 | 0.00 | 0.00 | 782.7 | 40 | BLACKROCK CASH FUNDS: TREASURY | BLACKROCK INC |
| ☐ | 🔍 | $0 | BLACKROCK LIQUIDITY: FEDFUND INST | TFDXX | TFDXX | GOVT/TREASURY/ REPO FUNDS | 0.01 | 0.01 | 0.01 | 10,061.9 | 38 | BLACKROCK LIQUIDITY FUNDS FEDFUND PORTFOLIO | BLACKROCK INC |
| ☐ | 🔍 | $0 | BLACKROCK LIQUIDITY: T-FUND INST | TSTXX | TSTXX | GOVT/TREASURY/ REPO FUNDS | 0.01 | 0.01 | 0.01 | 5,870.1 | 43 | BLACKROCK LIQUIDITY FUNDS T-FUND PORTFOLIO | BLACKROCK INC |
| ☑ | 🔍 | $0 | BOFA TREAS RESERVES/CAPITAL | CPLXX | CPLXX | GOVT/TREASURY/ REPO FUNDS | 0.00 | 0.00 | 0.00 | 7,550.1 | 46 | BOFA FUNDS SERIES TRUST -BOFA TREASURY RESERVES | BANK OF AMERICA CORP |
| ☐ | 🔍 | $0 | DREYFUS GOVT CASH MGMT/INS | DGCXX | DGCXX | GOVT/TREASURY/ REPO FUNDS | 0.00 | 0.00 | 0.00 | 21,944.7 | 58 | DREYFUS GOVERNMENT CASH MANAGEMENT | BANK OF NEW YORK MELLON CORP/THE |

☑ ☑ VIEW SELECTED GO

DISCLAIMER COPYRIGHT © 2011 INSTITUTIONAL CASH DISTRIBUTORS, LLC MEMBER FINRA/SIPC

MAY 12, 2011
WELCOME

SECURITY SELECTION SERVICE WORLDWIDE

TRANSPARENCYPLUS

USER PREFERENCES  TUTORIALS  LOG OUT

[UPDATE] [SEARCH] [SPONSOR ▼] [GO] CURRENCY SELECTION [US DOLLAR ▼] MAP EXPLORER

FUND SUMMARY

| SELECT TO REMOVE | AMOUNT | FUND NAME | ICD TICKER | FUND CATEGORY | 1 DAY YIELD | 7 DAY YIELD | 31 DAY YIELD | AUM | WAM | FUND COMPANY | PARENT |
|---|---|---|---|---|---|---|---|---|---|---|---|
| ☐ | $34,000,000 | BOFA TREAS RESERVES/CAPITAL | CPLXX | GOVT/TREASURY REPO FUNDS | 0.00 | 0.00 | 0.00 | 7,550.1 | 46 | BOFA FUNDS SERIES TRUST - BOFA TREASURY RESERVES | BANK OF AMERICA CORP |
| ☐ | $32,000,000 | GOLDMAN SACHS FS GOVT FUND/INST | FGTXX | GOVT/TREASURY REPO FUNDS | 0.01 | 0.01 | 0.01 | 32,512.3 | 54 | GOLDMAN SACHS FINANCIAL SQUARE FUNDS - GOVERNMENT FUND | GOLDMAN SACHS GROUP INC/THE |
| ☐ | $12,000,000 | BNY MELLON US TREASURY IRELAND | DYTPZ | OFFSHORE U.S. DOLLAR FUNDS | 0.00 | 0.00 | 0.01 | 10,465.3 | 47 | BNY MELLON US TREASURY FUND | BANK OF NEW YORK MELLON |

1004
1032
1062
1061

FUND DETAILS: DOWNLOAD PDF [FUND REPORT] [COMPREHENSIVE REPORT]

[FUND HOLDINGS] [PORTFOLIO CONCENTRATION] [REPO POSITION] [MAP POSITION]  1055
[EXPORT DATA] [REPO REPORT]

1012

| INVESTED VALUE (LOCAL CURRENCY) | SECURITY | SECURITY CUSIP | SECURITY TYPE | AS OF DATE | ICD TICKER | PAR (LOCAL CURRENCY) | MATURITY | % WEIGHT | SEC T/R SPONSOR |
|---|---|---|---|---|---|---|---|---|---|
| $2,250,559 | CITIGROUP GM TRI-PARTY REPO | NA | REPO | 04/22/2011 | CPLXX | $500,000,000 | 04/25/2011 | 6.619291 | REPO |
| $2,250,559 | MIZUHO REPO | NA | REPO | 04/22/2011 | CPLXX | $500,000,000 | 04/25/2011 | 6.619291 | REPO |
| $1,372,841 | UBS FINANCIAL SERVICES REPO | NA | REPO | 04/22/2011 | CPLXX | $305,000,000 | 04/25/2011 | 4.037768 | REPO |
| $1,350,335 | SOC GEN TRI-PARTY REPO | NA | REPO | 04/22/2011 | CPLXX | $300,000,000 | 04/25/2011 | 3.971575 | REPO |
| $1,260,313 | DEUTSCHE REPO | NA | REPO | 04/22/2011 | CPLXX | $280,000,000 | 04/25/2011 | 3.706803 | REPO |
| $1,125,279 | ROYAL BANK OF SCOTLAND REPO | NA | REPO | 04/22/2011 | CPLXX | $250,000,000 | 04/25/2011 | 3.309646 | REPO |
| $900,224 | MORGAN STANLEY REPO | NA | REPO | 04/22/2011 | CPLXX | $200,000,000 | 04/25/2011 | 2.647716 | REPO |
| $900,224 | SOC GEN TRI-PARTY REPO | NA | REPO | 04/22/2011 | CPLXX | $200,000,000 | 04/25/2011 | 2.647716 | REPO |
| $744,684 | ROYAL BANK OF SCOTLAND REPO | NA | REPO | 04/22/2011 | CPLXX | $165,000,000 | 07/14/2011 | 2.194360 | REPO |
| $675,168 | MORGAN J REPO | NA | REPO | 04/22/2011 | CPLXX | $150,000,000 | 04/25/2011 | 1.985767 | REPO |

1054

DISCLAIMER COPYRIGHT © 2011 INSTITUTIONAL CASH DISTRIBUTORS, LLC MEMBER FINRA/SIPC.

| | | | [T+] TRANSPARENCYPLUS 1108 | | | | | REPORT<br>REPORT DATE: 5/12/2011 | |

$ IN MILLION (UNLESS OTHERWISE INDICATED)

| SECTOR ANALYSIS | | | | AS OF 5/6/2011 | | | | | |
|---|---|---|---|---|---|---|---|---|---|
| | ABCP | CP | CDS/TIME DEP | FRN | TREASURY | GOVT | REPO | MTN | FA | OTHER |
| COMBINED % | 0% | 1% | 31% | 8% | 12% | 19% | 29% | | | |
| FGTXX | | | | 18% | 1% | 43% | 38% | | | |
| IE0004237156 | | 3% | 91% | | 6% | | | | | |
| CPLXX | | | | | 40% | | 60% | | | |
| DYTPZ | | | | | 52% | | 48% | | | |
| MOR042 | 9% | 16% | 75% | | | | | | | |
| COMBINED $ | 0.65 | 3.09 | 64.22 | 16.56 | 24.64 | 39.56 | 61.12 | | | |
| FGTXX | | | | 16.55 | 0.92 | 39.56 | 34.96 | | | |
| IE0004237156 | | 1.94 | 58.83 | | 3.88 | | | | | |
| CPLXX | | | | | 13.60 | | 20.40 | | | |
| DYTPZ | | | | | 6.24 | | 5.76 | | | |
| MOR042 | 0.65 | 1.15 | 5.39 | | | | | | | |
| CHANGE FROM LAST UPDATE | | 47% | -1% | 28% | 6% | -34% | 1% | | | |
| FGTXX | | | | 28% | | -34% | 10% | | | |
| IE0004237156 | | 50% | -1% | | -50% | | | | | |
| CPLXX | | | | | 15% | | -13% | | | |
| DYTPZ | | | | | 9% | | -12% | | | |
| MOR042 | | 41% | -3% | | | | | | | |
| CHANGE FROM LAST MONTH | | 41% | 1% | -15% | -7% | -87% | 25% | | | |
| FGTXX | | | | -20% | | -87% | 38% | | | |
| IE0004237156 | | 25% | 2% | | -200% | | | | | |
| CPLXX | | | | | 7% | | -5% | | | |
| DYTPZ | | | | | -2% | | 2% | | | |
| MOR042 | | 57% | -19% | | | | | | | |
| CHANGE FROM LAST YEAR | -218% | 59% | -4% | -4% | -35% | -90% | 29% | | | |
| FGTXX | | | | -15% | -24% | -91% | 38% | | | |
| IE0004237156 | | 65% | -4% | | -280% | | | | | |
| CPLXX | | | | | -32% | | 14% | | | |
| DYTPZ | | | | | -1% | | 1% | | | |
| MOR042 | -218% | 40% | -5% | | | | | | | |

T+ TRANSPARENCYPLUS  1116

REPORT
REPORT DATE: 5/12/2011
1124

$ IN MILLION (UNLESS OTHERWISE INDICATED)

FUND HOLDINGS (TOP 25 HOLDINGS LISTED)

| SPONSOR | TICKER | AMOUNT | % OF MY PORTFOLIO | % OF FUND HOLDINGS | WTD % OF ASSETS HELD IN FUNDS | CREDIT RATINGS & WATCH | | | |
|---|---|---|---|---|---|---|---|---|---|
| | | | | | | MOODYS | | S&P | |
| TOP 25 HOLDINGS | | $198,814,427 | 94.75% | 0.00958% | | | | | |
| REPO | REPO | $64,695,157 | 30.83% | 0.00312% | | | | | |
| GOLDMAN SACHS FS GOVT FUND/INST | FGTXX | $42,211,296 | 20.12% | 0.11679% | 0.0002973% | | | | |
| BOFA TREAS RESERVES/CAPITAL | CPLXX | $16,667,545 | 7.94% | 0.22065% | 0.0009932% | | | | |
| BNY MELLON U.S. TRASURY IRELAND (FORMERLY DREYFUS) | DYTPZ | $5,816,315 | 2.77% | 0.05331% | 0.0000586% | | | | |
| UNITED STATES OF AMERICA | 3352Z US | $21,030,334 | 10.02% | 0.00101% | | AAA | STABLE | AAAU | NEG |
| BOFA TREAS RESERVES/CAPITAL | CPLXX | $14,021,432 | 6.68% | 0.18562% | 0.0008355% | | | | |
| BNY MELLON U.S. TREASURY IRELAND (FORMERLY DREYFUS) | DYTPZ | $6,183,685 | 2.95% | 0.05668% | 0.0000623% | | | | |
| GOLDMAN SACHS FS GOVT FUND/INST | FGTXX | $825,217 | 0.39% | 0.00228% | 0.0000058% | | | | |
| FEDERAL NATIONAL MORTGAGE ASSOCIATION | FNM US | $19,803,513 | 9.44% | 0.00095% | | AAA | STABLE | NR | NA |
| GOLDMAN SACHS FS GOVT FUND/INST | FGTXX | $19,803,513 | 9.44% | 0.05479% | 0.00013950% | | | | |
| BNP PARIBAS | BNP FP | $13,878,792 | 6.61% | 0.00067% | | AA2 | STABLE | AA | NEG |
| BNP PARIBAS GLOBAL LIQUIDITY FUND - EURO-INSTITUTIONAL IRELAND | IE0004237156 | $10,528,827 | 5.02% | 0.40463% | 0.0100525% | | | | |
| BOFA TREAS RESERVES/CAPITAL | CPLXX | $2,950,483 | 1.41% | 0.03906% | 0.0001758% | | | | |
| AVIVA EURO LIQUIDITY FUND | MOR042 | $399,482 | 0.19% | 0.00002% | 0.0000000% | | | | |
| FEDERAL HOME LOAN BANKS | 1799Z US | $10,914,652 | 5.20% | 0.00053% | | AAA | STABLE | NA | NA |
| GOLDMAN SACHS FS GOVT FUND/INST | FGTXX | $10,914,652 | 5.20% | 0.03020% | 0.0000769% | | | | |
| CREDIT AGRICOLE GROUPE | 4068781Z FP | $9,668,955 | 4.61% | 0.00047% | | NA | NA | NA | NA |
| BNP PARIBAS GLOBAL LIQUIDITY FUND - EURO-INSTITUTIONAL IRELAND | IE0004237156 | $9,101,190 | 4.34% | 0.34976% | 0.0086895% | | | | |
| AVIVA EURO LIQUIDITY FUND | MOR042 | $567,765 | 0.27% | 0.00003% | 0.0000000% | | | | |
| FEDERAL HOME LOAN MORTGAGE CORP | FRE US | $7,174,803 | 3.42% | 0.00035% | | AAA | STABLE | NA | NA |

1120

T+ TRANSPARENCYPLUS  1128

REPORT DATE: 5/12/2011

$ IN MILLION (UNLESS OTHERWISE INDICATED)

| FUND HOLDINGS (TOP 25 HOLDINGS LISTED) | | | FINANCIAL SUMMARY (AS OF 5/10/2011) | | | | |
|---|---|---|---|---|---|---|---|
| SPONSOR | BLOOMBERG TICKER | SPONSOR DOMICILE | MARKET CAP | BALANCE SHEET | | | CAPITAL ADEQUACY |
| | | | | ASSETS | LIABILITIES | NET WORTH | |
| REPO | REPO | | | | | | |
| UNITED STATES OF AMERICA | 3352Z US | US | | | | | |
| FEDERAL NATIONAL MORTGAGE ASSOCIATION | FNM US | US | | 3,221,972 | 3,224,489 | -2,517 | |
| BNP PARIBAS | BNP FP | FR | 93,212 | 2,670,738 | 2,556,285 | 114,453 | 15 |
| FEDERAL HOME LOAN BANKS | 1799Z US | US | | 1,015,583 | 972,774 | 42,809 | |
| CREDIT AGRICOLE GROUPE | 4068781Z FP | FR | | 2,427,332 | 2,320,278 | 107,054 | 11 |
| FEDERAL HOME LOAN MORTGAGE CORP | FRE US | US | | 2,261,780 | 2,262,181 | -401 | |
| CREDIT MUTUEL-CIC GROUP | CMUT FP | FR | | 829,819 | 785,939 | 43,880 | 11 |
| SOCIETE GENERALE | GLE FP | FR | 46,189 | 1,513,127 | 1,444,994 | 68,133 | 12 |
| FEDERAL FARM CREDIT BANK | 1798Z US | US | | 214,353 | 187,229 | 27,124 | |
| UNEDIC | 220055Z FP | FR | | | | | |
| HSBC HOLDINGS PLC | HSBA LN | GB | 190,902 | 2,454,689 | 2,299,774 | 154,915 | 15 |
| DEXIA SA | DEXB BB | BE | 6,843 | 757,498 | 743,159 | 14,339 | 15 |
| BANCO SANTANDER SA | SAN SM | ES | 99,135 | 1,627,311 | 1,519,161 | 108,150 | 13 |
| GDF SUEZ | GSZ FP | FR | 84,923 | 246,813 | 152,291 | 94,522 | |
| INTESA SANPAOLO SPA | ISP IM | IT | 38,981 | 880,495 | 807,516 | 72,978 | 13 |
| BARCLAYS PLC | BARC LN | GB | 55,303 | 2,322,506 | 2,225,433 | 97,073 | 17 |
| UNICREDIT SPA | UCG IM | IT | 46,000 | 1,242,353 | 1,151,861 | 90,492 | 13 |
| BANK OF AMERICA CORP | BAC US | US | 124,332 | 2,264,909 | 2,036,661 | 228,248 | 16 |
| BPCE SA | 3358410Z FP | FR | | 865,375 | 824,574 | 40,800 | |
| FRENCH REPUBLIC | 223727Z FP | FR | | | | | |
| CITIGROUP INC | C US | US | 128,917 | 1,913,902 | 1,748,113 | 165,789 | 17 |
| BANCO BILBAO VIZCAYA ARGENTARIA SA | BBVA SM | ES | 54,094 | 738,790 | 688,701 | 50,089 | 14 |
| GENERAL ELECTRIC CO | GE US | US | 214,866 | 751,216 | 627,018 | 124,198 | |
| CREDIT AGRICOLE SA | ACA FP | FR | 38,189 | 2,129,911 | 2,060,209 | 69,702 | 13 |

FIG.18    1140

| | | [T+] TRANSPARENCYPLUS 1132 | | | | REPORT REPORT DATE: 5/12/2011 | | |
|---|---|---|---|---|---|---|---|---|

$ IN MILLION (UNLESS OTHERWISE INDICATED)

| FUND HOLDINGS (TOP 25 HOLDINGS LISTED) | | | STOCK SUMMARY (AS OF 5/10/2011) | | | | | |
|---|---|---|---|---|---|---|---|---|
| SPONSOR | BLOOMBERG TICKER | CURRENT STOCK $ | CHANGE | | | | | |
| | | | 1 WK | % CHG | 52 WK HIGH | % CHG | 52 WK LOW | % CHG |
| REPO | REPO | | | | | | | |
| UNITED STATES OF AMERICA | 3352Z US | | | | | | | |
| FEDERAL NATIONAL MORTGAGE ASSOCIATION | FNM US | | $0 | | | | | |
| BNP PARIBAS | BNP FP | $54 | $53 | 1.27% | $60 | -9.68% | $41 | 32.64% |
| FEDERAL HOME LOAN BANKS | 1799Z US | | | | | | | |
| CREDIT AGRICOLE GROUPE | 4068781Z FP | | | | | | | |
| FEDERAL HOME LOAN MORTGAGE CORP | FRE US | | $0 | | | | | |
| CREDIT MUTUEL-CIC GROUP | CMUT FP | | | | | | | |
| SOCIETE GENERALE | GLE FP | $43 | $46 | -5.46% | $53 | -18.25% | $30 | 45.03% |
| FEDERAL FARM CREDIT BANK | 1798Z US | | | | | | | |
| UNEDIC | 220055Z FP | | | | | | | |
| HSBC HOLDINGS PLC | HSBA LN | $656 | $663 | -0.95% | $740 | -11.26% | $595 | 10.25% |
| DEXIA SA | DEXB BB | $3 | $3 | -2.01% | $4 | -35.50% | $3 | 1.69% |
| BANCO SANTANDER SA | SAN SM | $8 | $8 | -2.49% | $11 | -22.31% | $7 | 15.01% |
| GDF SUEZ | GSZ FP | $26 | $28 | -5.57% | $30 | -12.60% | $23 | 16.01% |
| INTESA SANPAOLO SPA | ISP IM | $2 | $2 | -3.86% | $3 | -20.59% | $2 | 13.82% |
| BARCLAYS PLC | BARC LN | $278 | $286 | -2.88% | $349 | -20.39% | $253 | 9.86% |
| UNICREDIT SPA | UCG IM | $2 | $2 | -3.88% | $2 | -25.77% | $1 | 13.40% |
| BANK OF AMERICA CORP | BAC US | $12 | $13 | -2.62% | $17 | -29.85% | $11 | 12.47% |
| BPCE SA | 3358410Z FP | | | | | | | |
| FRENCH REPUBLIC | 223727Z FP | | | | | | | |
| CITIGROUP INC | C US | $44 | $45 | -2.35% | $52 | -14.29% | $35 | 25.04% |
| BANCO BILBAO VIZCAYA ARGENTARIA SA | BBVA SM | $8 | $9 | -4.80% | $10 | -21.19% | $7 | 20.06% |
| GENERAL ELECTRIC CO | GE US | $20 | $21 | -1.84% | $22 | -6.42% | $14 | 47.35% |
| CREDIT AGRICOLE SA | ACA FP | $11 | $11 | -0.45% | $13 | -14.32% | $8 | 40.61% |
| AVERAGE | | $46.73 | | -9.52% | | -10.50% | | 12.13% |

FIG.19      1144

| T+ TRANSPARENCYPLUS | 1136 | REPORT |
|---|---|---|
| | | REPORT DATE: 5/12/2011 |

$ IN MILLION (UNLESS OTHERWISE INDICATED)

FUND HOLDINGS (TOP 25 HOLDINGS LISTED) — CREDIT DEFAULT SWAP SUMMARY (AS OF 5/10/2011)

| SPONSOR | 5-YR CDS | 1 WEEK | NOMINAL | % CHG | T/W | 52 WK HI | NOMINAL | % CHG | 52 WK LOW | NOMINAL | % CHG |
|---|---|---|---|---|---|---|---|---|---|---|---|
| REPO | | | | | | | | | | | |
| UNITED STATES OF AMERICA | | | | | | | | | | | |
| FEDERAL NATIONAL MORTGAGE ASSOCIATION | | | | | | | | | | | |
| BNP PARIBAS | 100 | 96 | 4 | 3.81% | W | 153 | -53 | -34.55% | 74 | 26 | 34.53% |
| FEDERAL HOME LOAN BANKS | | | | | | | | | | | |
| CREDIT AGRICOLE GROUPE | | | | | | | | | | | |
| FEDERAL HOME LOAN MORTGAGE CORP | | | | | | | | | | | |
| CREDIT MUTUEL-CIC GROUP | | | | | | | | | | | |
| SOCIETE GENERALE | 126 | 121 | 5 | 4.29% | W | 203 | -77 | -38.06% | 88 | 38 | 42.84% |
| FEDERAL FARM CREDIT BANK | | | | | | | | | | | |
| UNEDIC | | | | | | | | | | | |
| HSBC HOLDINGS PLC | 94 | 91 | 4 | 4.03% | W | 147 | -52 | -35.70% | 76 | 19 | 24.58% |
| DEXIA SA | | | | | | | | | | | |
| BANCO SANTANDER SA | 211 | 186 | 25 | 13.36% | W | 298 | -87 | -29.28% | 124 | 87 | 70.12% |
| GDF SUEZ | 73 | 72 | 1 | 2.07% | W | 103 | -29 | -28.43% | 54 | 20 | 37.03% |
| INTESA SANPAOLO SPA | 138 | 132 | 6 | 4.29% | W | 208 | -70 | -33.74% | 90 | 48 | 53.08% |
| BARCLAYS PLC | 119 | 112 | 6 | 5.78% | W | 191 | -73 | -37.97% | 96 | 23 | 23.50% |
| UNICREDIT SPA | 150 | 153 | -2 | -1.44% | T | 238 | -87 | -36.76% | 118 | 32 | 27.53% |
| BANK OF AMERICA CORP | 133 | 131 | 2 | 1.39% | W | 219 | -86 | -39.42% | 128 | 5 | 3.57% |
| BPCE SA | | | | | | | | | | | |
| FRENCH REPUBLIC | 79 | 74 | 5 | 6.48% | W | 116 | -37 | -31.93% | 59 | 20 | 34.52% |
| CITIGROUP INC | 123 | 121 | 2 | 1.44% | W | 232 | -109 | -47.03% | 117 | 5 | 4.61% |
| BANCO BILBAO VIZCAYA ARGENTARIA SA | 216 | 201 | 15 | 7.65% | W | 319 | -103 | -32.28% | 139 | 77 | 55.69% |
| GENERAL ELECTRIC CO | 88 | 86 | 1 | 1.73% | W | 203 | -116 | -56.81% | 82 | 6 | 6.80% |
| CREDIT AGRICOLE SA | 134 | 130 | 4 | 3.23% | W | 222 | -87 | -39.41% | 103 | 31 | 30.42% |
| WEIGHTED AVERAGE | 119 | | | | | | | | | | |

FIG.20      1148

COLLECTIVELY ANALYZING HOLDINGS ACROSS MULTIPLE FIXED INCOME PRODUCTS

FIELD OF THE INVENTION

The present invention generally relates to analytics for fixed income products including short-term fixed income products such as money market products. More specifically, the present invention relates to systems and methods that provide and make available various types of exposure analytics and reporting information in relation to fixed income products and their individual holdings.

BACKGROUND

One of the most common types of fixed income products are money market products. Money market products, such as money market funds and other short-term liquidity vehicles, differ from conventional investment vehicles in terms of the objectives of such products, the sources and information available regarding such products and the regulatory environment of such products. For example, while conventional investment vehicles are typically analyzed primarily based on growth and income, money market products are generally valued primarily for capital preservation and liquidity. Money market products are used by corporate treasurers and money managers to handle cash that needs to be available to meet short-term obligations such as payroll and inventory purchases. Though these products can be held by individual investors, as a practical matter they are impractical for many individual investors due to typically high minimum holding requirements, and the objectives of those products typically do not match the objectives of individual investors. These products thus form an important part of what is sometimes called the "shadow banking system" and are critical to the operation of the economy in most nations.

Indeed, a lapse of confidence in these products was at the core of the financial crisis of September 2008 that nearly caused financial markets to seize throughout the western world and beyond. Much of the panic that followed the bankruptcy of Lehman Brothers Holdings, Inc., resulted from the difficulty that companies and other entities had in evaluating their risks and the immediacy of the impact due to uncertain liquidity positions. These events highlight the difficulty of obtaining actionable information for analytics in this space as well as the desperate need for such analytic tools, not only to facilitate improved management of cash, but also to avoid unnecessary panic.

One of the most common and useful of money market products is the money market fund. Established in the early 1970s, money market funds (e.g., money market mutual funds) are investment companies that seek to limit exposure to losses due to credit, market and liquidity risks and thus can be seen as alternative to the more traditional "safe" havens of savings and other types of bank accounts. Representative high-quality securities in which money market funds may invest include commercial paper (CP), asset-backed commercial paper (ABCP), repurchase agreements, short-term bonds, floating rate notes, variable rate demand notes and other money funds just to name a few. The CP market, for instance, consists of short-term notes issued by a wide variety of institutions such as domestic and foreign nonfinancial corporations, banks, and finance companies that provide, among other things, automobile and credit card financing to U.S. households. Unlike many other financial instruments, money market funds seek to maintain a stable net asset value (NAV) of $1 per share which is attractive to investors that seek to minimize tax, accounting, and recordkeeping burdens.

In the corporate realm, company treasurers are tasked with, among other duties, liquidity risk management, management of what may be large amounts of cash and currency (e.g., 100s of millions of dollars), and oversight of pension investment. For instance, treasurers must ensure that enough liquid currency is on hand or otherwise available to meet payroll obligations, maintain appropriate inventory levels, and the like. As part of a comprehensive financial management plan, treasurers often establish accounts at one or more financial institutions for investing company currency in a number of money market and other types of funds. Treasurers may seek the guidance of one or more account managers for investment and allocation strategies and advice.

Because of the importance of money market funds to so many investors and other market participants, the U.S. Securities and Exchange Commission (SEC) provides some limits on the risk that these funds may take under Rule 2a-7. Accordingly, in order for a fund to hold itself out to the public as being a money market fund, the SEC requires that such a fund must meet the strong protections contained in Rule 2a-7. Among other things, Rule 2a-7 has "risk-limiting conditions" that protect investors and funds from excessive exposure to certain risks, such as credit, currency and interest rate risks. To this end, money market funds must comply with stringent maturity standards (e.g., cannot maintain a dollar-weighted average portfolio maturity greater than a particular number of calendar days), quality standards (must limit portfolio investments or securities to those presenting minimal credit risk), and diversification standards (e.g., cannot have more than 5% of total assets in securities issued by the issuer of a recently-acquired security) to minimize the deviation between a money market fund's stabilized NAV and the market value of its portfolio. These provisions include the requirement that money market funds only invest in high-quality securities for which the fund's board of directors (or its delegate) determines present minimal credit risks. The risk-limiting provisions imposed by the SEC, combined with the other protections of the federal securities laws that apply to all mutual funds, had until recent times generally been successful in protecting investors' interests and maintaining their confidence in money market funds.

While money market funds aim to never lose money (i.e., they seek a stable NAV of $1 per share), a couple of money market funds since the 1970s have had their NAVs fall below $1 per share (i.e., they "broke the buck"), most recently during the financial crisis of 2008; the resulting investor anxiety almost caused a run on money market funds and the entire shadow banking system as investors redeemed their holdings and funds were forced to liquidate assets or impose limits on redemptions. The resulting spike of redemptions caused a drop in demand for CP which limited companies from rolling over their short-term debt for obtaining cash to repay maturing debt. There was a fear that the run could cause extensive bankruptcies, a debt deflation spiral, and serious damage to the real economy, as in the Great Depression.

In response to the events leading up to the financial crisis of 2008 and the resulting aftermath, the SEC chose to revisit the safeguards embedded in Rule 2a-7. In 2009, the SEC proposed changes to Rule 2a-7 (which were adopted in 2010) intended to increase the resilience of money market funds to market disruptions and thereby make it less likely that a money market fund would fail to provide investors with the security they seek. More specifically, the proposal sought to amend Rule 2a-7 to strengthen portfolio quality, maturity, and liquidity requirements, require that critical information be reported regularly to the SEC, and set forth conditions pursuant to which funds could engage in orderly liquidation procedures if needed.

For instance, Rule 2a-7 as amended now prohibits a fund holding itself out as a money market fund from maintaining a dollar-weighted average portfolio maturity that exceeds 60 calendar days instead of 90 calendar days as in the previous version of the Rule. As another example, a money market fund now cannot have more than three percent of its total assets invested in Second Tier securities compared to five percent previously. Amended Rule 2a-7 also includes a number of entirely new provisions. For example, money market funds now must comply with daily and weekly liquidity provisions that specify a particular percentage of assets that must be in cash, U.S. Treasury securities, or securities that convert into cash during the next few business days. Other new provisions require periodic "stress testing" (ensuring the money market fund's ability to maintain a stable $1 NAV) and that money market fund holding and security information (e.g., issuers, category of investment such as Treasury debt, ABCP, CD and/or the like, CUSIP number, etc.) is posted to the fund's website at least monthly and maintained for a period of at least six months. Among the information that must be posted to the fund's website is a link to a website of the SEC where a user may obtain the most recent 12 months of publicly available information filed by the money market fund pursuant to 17 CFR 270.30b1-7.

SUMMARY OF THE INVENTION

While the regulatory response to the financial crisis of 2008 has made more information available in a market space where unavailability of adequate information has proved to be critical, the present inventors have recognized that the new regulations do not in themselves always provide the actionable information that would be most beneficial to corporate treasurers and other money managers (collectively referred to herein as "treasurers"). There are a number of reasons for this. One reason, as will be discussed in more detail below, is that the information provided by funds and other sources is provided in piecemeal and idiosyncratic form, and is therefore difficult for treasurers to make use of in day-to-day management. This is particularly true where treasurers diversify holdings (i.e., invest in two or more money market products) such that the necessary information is supplied by multiple sources. In this regard, the needs of corporate treasurers and other retail users differ from those of financial advisors employed by a brokerage or similar financial institution who may have certain proprietary analytics tools.

In addition, the information required to be supplied under the new regulations does not necessarily match the analytics that are of interest to treasurers or may become of interest. For example, a treasurer may wish to analyze not only exposure with respect to a specific asset or regulated characteristic, but also with respect to sponsors or geography or other metrics, e.g., for one or more of the so-called PIIGS economies (those of Portugal, Ireland, Italy, Greece and Spain). Moreover, while the new reporting requirements allow for significant analysis of holdings after the fact, they are of limited value for guiding decision making in real-time.

The present inventors have further recognized that, with the proliferation of money market products combined with the increased stringency of Rule 2a-7 and other rules and regulations, an increasing quantity of information (e.g., money market fund holding and security information required to be periodically posted to the fund's website) exists that, if accessed, processed, supplemented and appropriately analyzed, can be used by treasurers to generate and execute appropriate management strategies or simply to understand current or prospective positions. Various types of "best practices" have been defined (e.g., Corporate Treasury Best Practices) that serve to provide treasurers and institutional cash traders with benchmark treasury practices that generally aim for the preservation of capital and liquidity, while enabling some yield. For instance, such best practices may specify guideline values or ranges for various money market product attributes such as maximum holdings in any single money market product, maximum exposure to specific countries, and the like. Such best practices may also be defined as internal guidelines, e.g., that are more stringent or otherwise different from industry or regulatory standards. That is, based on specific objectives and risk tolerances, treasurers can establish specific internal guidelines that may or may not at least partially overlap with any best practices guidelines and that can be periodically reviewed to verify compliance.

However, with the increase in the quantity of information related to money market products and their respective securities comes an increasingly difficult task in obtaining, analyzing and utilizing such information (e.g., to ensure compliance with established guidelines) for a number of different money market products among what may be numerous different accounts in an effective and time efficient manner. Furthermore, while treasurers often seek to further reduce risk of loss by way of purchasing shares in two or more money market products (i.e., by way of further diversifying), doing so often may not increase diversification as much as expected because many money market funds hold investments in the same securities, in securities in the same sector of the economy, in securities that are associated with the same domicile country or sponsor, etc.

Complicating matters is the fact that various financial institutions may utilize different identifiers to refer to the same security and formats for reporting. For instance, first and second money market products associated with different sponsors may both include the same security (e.g., first and second instances or holdings of the same particular ABCP) but may use different syntax or semantics (e.g., different ticker symbols) to refer to the security. Thus, a treasurer or other party reviewing the holdings of two or more money market products may be misled into believing that such products are more diversified than they really are. In additional to such differences in form or syntax, there can be substantive differences between attributes reported by different sources, and substantive differences between what is reported or otherwise obtained and the information that may be desired, e.g., mismatches of geographic regions or sub-regions. Additionally, it may be more difficult for treasurers to gauge credit exposure, optimize asset allocation, etc., due to the non-standardized use of money market product and related holding identifiers, the fact that treasurers typically must continually visits hundreds or thousands of different sources to obtain reporting information for money market products and related securities to guide their decision-making, and the like.

In this regard, it has been determined that systems, methods, tools and the like (i.e., "utilities") are needed that enable corporate treasurers and other investors to view consolidated credit risk on individual holdings across multiple fixed income products (FIPs) such as multiple money market products, allowing such investors to focus on the execution side of treasury operations while reducing the fact gathering process. As opposed to relying primarily or solely on one or more types of FIP or security ratings (e.g., those provided by Morningstar®, Standard & Poors), the utilities disclosed herein may provide investors (e.g., corporate treasury departments)

with access to vital and timely information to assist in guiding day-to-day investment decisions and ensuring compliance with one or more internal and/or external guidelines. As will be discussed in more detail below, the holdings of the FIPs (each of which may be considered an instance of an underlying security or holding such as a CDS, ABCP, and/or the like) of one or more actual or hypothetical accounts may be aggregated and filtered (e.g., by common identifier, sponsor, issuer, domicile nation, etc.) either within an FIP and/or across multiple FIPs and analyzed to obtain numerous types of information (e.g., asset value in currency or as a percentage of overall asset value, stock performance, credit default swap statistics) and then presented on any appropriate display in numerous formats (e.g., charts, graphs, etc.) to enable users to identify and gauge credit exposure.

In addition to allowing for an analysis of current or existing financial positions, the utilities disclosed herein can also be used to analyze "what-if" scenarios. For instance, corporate treasurers may use the utilities to perform one or more hypothetical reallocations of money market funds within an account or its total assets under management, and may be able to observe the effect that such reallocations have on guideline compliance, credit exposure, and the like. It will be appreciated that this is critical to maintain continuous compliance rather than simply identifying instances of non-compliance after the fact. In conjunction with the analytical capabilities, the utilities disclosed herein may also facilitate trading of FIPs (e.g., via a trading platform) among one or more accounts of an entity's total assets under management. In this regard, corporate treasurers and other users may be able to quickly react to "headline risk" in what may be a rapidly changing money market.

Importantly, the present invention thus allows a treasurer or other investor to consider the aggregate quantitative positions of all assets under management (AUM). In this regard, each money market fund or other FIP is typically composed of a number of component holdings and is thus a "portfolio" in nature. In many cases, a number of FIPs is held in a single account of an investment institution. Moreover, the treasurer may have multiple accounts with that institution. In addition, a well diversified company may have accounts with a number of investment institutions. All of this hierarchical layering (individual FIP portfolios, multiple FIPs in an account, multiple accounts in an institution, and multiple institutions) allows treasurers to execute critical money management strategies.

However, it also complicates efforts to understand the company's aggregate positions and exposures. A corporate treasurer often needs to understand positions and exposures for all, or at least a selected set of all, AUM. The treasurer also often needs to understand the aggregate quantitative position in this regard and not merely relative positions or the like. For example, to ensure that there will be adequate cash on hand to make payroll or an inventory purchase on a given date, a treasurer may wish to consider liquidity positions (e.g., in a total dollar amount) across all AUM. Similarly, in relation to an identified headline risk, the treasurer may be called upon to quantify the amount of assets at perceived risk across all AUM. The present invention allows analysis across all AUM, even when distributed across multiple accounts at multiple institutions, provided that the information is made available to the analytics tool (even if in its native form).

In accordance with one aspect of the present invention, a utility is provided for use in building a database of holding (e.g., security) information for a number of FIPs such as money market products (MMPs). The utility can be utilized by the tools disclosed herein to perform numerous types of analytics to assist corporate treasurers and other users in making investment decisions in relation to liquid currency (e.g., corporate treasuries). As noted above, it is common for treasurers to hold multiple accounts, each of which includes multiple FIPs. Treasurers have an interest in understanding the risk exposure and liquidity position, among other things, of the cumulative positions defined by these accounts. However, because assets are distributed over multiple accounts, and because the information regarding the FIPs and their holdings are provided from many sources in many forms, it is difficult to obtain an accurate assessment of the cumulative positions defined by the multiple accounts. The noted utility of the present invention thus involves establishing a database that enables information regarding FIPs from different sources to be standardized so that the data can be aggregated and analyzed across multiple accounts including multiple FIPs composed of multiple holdings. Moreover, this information can be supplemented to provide enhanced information for analytics. In this regard, a subject matter expert can, for example, associate sponsor information, domicile information or any other enhanced data that may be desired for analysis. Constructing this database thus provides a fundamental tool, heretofore unavailable, for enabling ready analysis and understanding of the collective positions in multiple FIPs.

The noted utility involves obtaining a listing of FIPs (e.g., from one or more financial information providers) that are identified by one or more types of FIP identifying data (e.g., ticker symbols, CUSIP numbers or other descriptors). The FIPs may be administered by domestic and/or international companies. For each FIP, the utility further involves correlating the one or more types of FIP identifying data with a standardized FIP identifier (e.g., in the event that two information sources utilize different numbers or symbols to identify the same FIP), acquiring a listing of holdings (i.e., securities such as bonds, ABCP, etc.) that are held by the FIP, and acquiring a plurality of attributes for each holding (e.g., par, maturity date, percent weight of corresponding FIP, etc.). In this aspect, each holding in each listing is identified by one or more types of holding identifying data (e.g., ticker symbols, CUSIP numbers, etc.) and each listing of holdings is made accessible in accordance with applicable money market regulations (e.g., those promulgated by the SEC, such as Rule 2a-7). The utility also obtains attribute information for multiple holdings and standardizes the attribute information. This may involve standardization with respect to terminology, syntax or substance (e.g. normalizing varying references to regions or subregions).

The utility of this aspect also includes mapping, for each holding, the respective one or more types of holding identifying data to a standardized holding identifier (e.g., to a standardized internal ticker symbol for use in analysis and trading purposes), associating each standardized FIP identifier with a corresponding listing of standardized holding identifiers, and storing, in a database, information for each FIP according to its standardized FIP identifier. The information for each FIP includes the one or more types of FIP identifying data, the listing of standardized holding identifiers, and the plurality of metrics for each holding. Among other advantages, this utility generates a database of FIP and related holding information that may be used to research and analyze one or more FIPs and/or underlying securities even if the same FIP or security is identified by two or more different identifiers.

In one arrangement, attributes or metrics for each of an FIP's respective holdings or securities may be aggregated and stored along with the standardized FIP identifier for the FIP in the database. For instance, the metrics for each holding may include at least one of time until maturity, one or more types of yields, and asset value in currency, and the aggregating may include manipulating the metrics to obtain at least one of a weighted average maturity (WAM), one or more types of average yields, and a total assets under management for each FIP. In particular, it is noted that the attributes or metrics may be first order attributes (e.g., a direct attribute of the holding such as a sponsor or issuer of the holding) or second order attributes (e.g., a characteristic or value derived from an attribute or "attribute of an attribute" such as domicile of an issuer or sponsor). The various steps of the method (i.e., the obtaining, correlating, acquiring, mapping, associating and storing) may be repeatedly performed according to a predetermined schedule (e.g., to maintain current or up to date information in the database for use by corporate treasurers).

Upon generation of the database, the utility may further involve receiving one or more types of FIP identifying data (e.g., native and/or standard FIP IDs) for a plurality of FIPs of AUM, obtaining from the database information about each of the FIPs of the AUM in response to the receiving, and presenting the obtained information on a display. The obtained information for each FIP may include at least some of the metrics for each of a number of holdings held by the FIP. For instance, analytics of the metrics of the holdings of the AUM (e.g., across two or more FIPs) may be collectively executed such as by aggregating metrics among holdings of the AUM having at least one of a common standardized holding identifier, sponsor, issuer and domicile nation.

In accordance with another aspect of the invention, a utility is provided for use in collectively analyzing money market products of AUM. That is, the utility allows treasurers or other users to collectively analyze positions that may involve multiple FIPs and/or multiple accounts. The utility involves receiving identifying information for a plurality of FIPs associated with the AUM, first using the identifying information to obtain from a database a listing of identifying data for each of a plurality of holdings that are respectively held by the FIPs of the AUM, second using the identifying data to obtain metrics related to the FIPs and their respective holdings from the database, and sending the metrics for presentation on a display (e.g., sending the metrics for storage in a webpage that may be accessed by a browser of a user's client device and presented on the user's display).

In one arrangement, the utility involves grouping, using a processor, at least one of a) two or more FIPs and b) two or more holdings, and then performing an analysis on metrics of the grouped FIPs and/or holdings. In this arrangement the results of the analysis may be sent for presentation on a display. For instance, two or more holdings may be grouped according to a first metric (e.g., by identifier, sponsor, domicile nation, etc.) and then an analysis may be performed on the grouped holdings using a second metric different than the first metric (e.g., summing asset values of those holdings having a common first metric). In another arrangement, any of the various metrics and/or analytics may be compared to any appropriate standard or guideline and then a decision may presented to a user on a display as to whether or not the analytics comply with the at least one standard or guideline.

In another aspect, a utility in accordance with the present invention includes accessing a network-based analysis tool resident on a host platform that has access to a database including metrics related to a plurality of holdings held by a plurality of FIPS, sending identifying information for each of a number of FIPs of an AUM to the network-based analysis tool, and receiving, on a display, a graphical analysis of a first type of metric of holdings of the AUM that have been grouped together according to a second metric different than the first metric. This output information may include a quantification of the aggregated holdings, e.g., in terms of total shares held, dollar amounts held, etc. The holdings of each FIP are accessible in accordance with applicable money market regulations.

In one arrangement, the at least one standard or guideline specifies at least one of a) the maximum position in any single FIP as a percentage of total financial AUM value, b) the maximum position in any single FIP in terms of at least one monetary unit, c) the maximum position in any single FIP as a percentage of that FIP's total AUM value, d) the maximum position in any single holding issuer or sponsor as a percentage of total financial AUM value, e) the maximum position in any single country, based on holding sponsor or issuer domicile, as a percentage of the total financial AUM value, and f) the maximum position in a specific country, based on holding sponsor or issuer domicile, as a percentage of the total financial AUM value.

In accordance with the present invention, this standard or guideline analysis may be performed with respect to financial products more generally and is not limited to FIPs or MMPs, e.g., for use by general investors in comparing the assets of multiple accounts or the like to user defined or externally defined guidelines. The system can use the standards or guidelines to generate proposed transactions if desired.

In another arrangement, the utility may include receiving, on the display, a graphical indication that results of the analysis fail to comply with the at least one standard or guideline; sending, in response to receiving the graphical indication of the failure to comply, a proposed transaction to the network-based analysis tool that includes at least a portion of one or more FIPs (e.g., two, three, or more) to be added to and/or removed from the AUM; and receiving, on the display, a graphical indication as to whether results of a subsequent instance of the analysis comply with the at least one standard or guideline. For instance, the subsequent instance of the analysis may incorporate at least some information related to the proposed transaction.

In accordance with another aspect of the invention, a processing platform is provided for use in collectively analyzing money market funds of an AUM. The processing platform has a processing module and a memory module logically connected to the processing module and having a set of computer readable instructions that are executable by the processing module. The instructions include obtaining a listing of FIPs that are identified by one or more types of FIP identifying data, and then, for each FIP, correlating the one or more types of FIP identifying data with a standardized FIP identifier; acquiring a listing of holdings that are held by the FIP, where each holding in each listing is identified by one or more types of holding identifying data, and where each listing of holdings is made accessible in accordance with applicable money market regulations; and acquiring a plurality of metrics for each holding.

The computer readable instructions also include mapping, for each holding, the respective one or more types of holding identifying data to a standardized holding identifier; associating each standardized FIP identifier with a corresponding listing of standardized holding identifiers; and storing, in a database, information for each FIP according to its standardized FIP identifier. The information for each FIP includes the one or more types of FIP identifying data, the listing of standardized holding identifiers, and the plurality of metrics for each holding.

One set of computer-readable instructions may receive identifying information for a plurality of FIPs associated with an AUM, first use the received identifying information to obtain from the database a listing of identifying data for each of a plurality of holdings that are respectively held by the FIPs of the AUM, second use the identifying data to obtain from the database metrics related to the FIPs and their respective holdings, and send the metrics for presentation on a display. Another set may group two or more holdings according to a first metric, perform an analysis on the grouped holdings using a second metric different than the first metric, and send results of the analysis for presentation on the display. Another set may determine whether the results of the analysis comply with at least one standard or guideline related to the analysis, and send the determination for presentation on the display. For instance, the latter set may receive a proposed transaction comprising at least a portion of one or more FIPs to be added to and/or removed from the AUM, perform a subsequent instance of the analysis, determine whether results of the subsequent instance of the analysis comply with the at least one standard or guideline, and send the determination for presentation on the display.

It should be appreciated that the various aspects discussed herein may be implemented via any appropriate number and/or type of platforms, modules, processors, memory, etc., each of which may be embodied in hardware, software, firmware, middleware, and/or the like.

BRIEF DESCRIPTION OF THE DRAWINGS

FIG. 2 is a data structure of a database that may be built by and/or used in conjunction with the system of FIG. 1.

FIG. 3 is another data structure of a database that may be built by and/or used in conjunction with the system of FIG. 1.

FIG. 4 is another data structure of a database that may be built by and/or used in conjunction with the system of FIG. 1.

FIG. 6 is another data structure of a database that may be built by and/or used in conjunction with the system of FIG. 1.

FIGS. 9-14 illustrate screenshots of a FIP portal that may be presented on a display of a client device in conjunction with conducting an analysis of one or more user accounts.

FIGS. 15-20 illustrate screenshots of pages of a comprehensive report in relation to one or more accounts that may be accessed and/or generated by the FIP portal discussed in relation to FIGS. 9-14.

DETAILED DESCRIPTION OF THE DRAWINGS

The present disclosure generally relates to utilities designed to deliver on-demand financial product intelligence to corporate treasurers, money managers and the like by consolidating and analyzing an array of risk views across multiple fixed income products such as multiple short-term investment products. In much of the following discussion, the invention is illustrated with respect to money market products (MMPs) such as money market funds, which is a particularly useful implementation due to the pervasiveness of such products and the availability of information per applicable regulations. However, it will be appreciated that aspects of the invention are not limited to these products. In one implementation, the utilities herein are operable to gather various MMP attributes (e.g., metrics related to an MMP as a whole, metrics related to individual investments of an MMP, etc.) from a variety of disparate information sources and to build or maintain one or more databases (e.g., relational database(s)) of such information in a manner that makes the information readily searchable and capable of analysis to generate inferences and various types of information that treasurers and other investors can use in making investment decisions in what may be a rapidly changing marketplace. The utilities disclosed herein are also operable to retrieve data from the one or more databases corresponding to one or more actual or hypothetical user accounts (including one or more MMPs) and provide numerous analytics on the retrieved information that may be used by treasurers and other investors to ensure compliance with various guidelines (e.g., industry-wide, external, intraorganizational, internal, etc.). Representative holdings of an MMP (e.g., a money market fund or MMF) may include short-term debt securities such as a CDS, commercial paper, ABCP, floating rate notes (FRN), repurchase agreements (REPO), short term government securities (e.g., bills, notes, bonds), time deposits, and/or the like.

Figure 1:
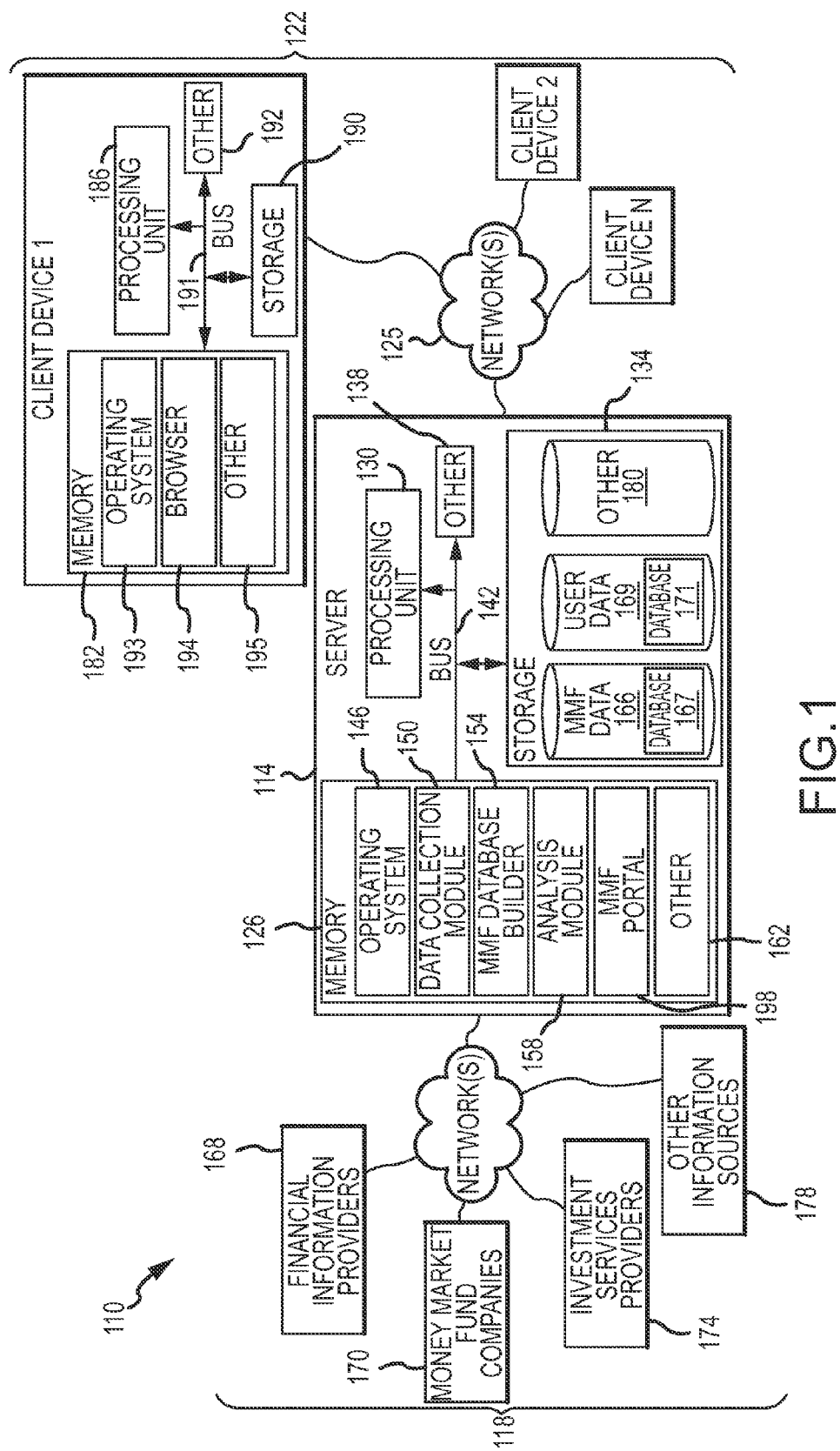
FIG. 1 is a block diagram of a system that is operable to build one or more databases of FIP information (e.g., money market product information) and provide access to such information and related analytics to one or more users or client devices.

FIG. 1 illustrates a functional block diagram of a system 110 that may be used to perform data gathering for MMP and/or related holding information along with related analytics, and subsequently present such gathered data and analytics to one or more users. The system 110 may include at least one server 114 that may generally coordinate data retrieval from one or more information sources 118 over one or more networks 124 (e.g., Internet, WANs, LANs) and subsequent data analytics before passing such data and related analytics to one or more client devices 122 over one or more networks 125 (e.g., Internet, WANs, LANs). While the server 114 will be shown and described as a single device (e.g., server, laptop, desktop, mobile device, and/or other computing device), one or more functionalities or processes of the server 114 may be allocated among a number of machines, devices and/or processes which may or may not be embodied in a single housing. In some arrangements, the data collection process may be handled by a first machine or group of machines or processes while the subsequent analyses performed on such collected data could be handled or performed by a second machine or group of machines or processes.

The server 114 may include memory 126 (e.g., one or more RAM or other volatile memory modules), a processing unit 130 (e.g., one or more CPUs) for executing computer readable instructions from the memory 126, storage 134 (e.g., one or more magnetic disks or other non-volatile memory modules), and/or a number of other components 138 (e.g., input devices such as a keyboard and mouse, output devices such as a display and speakers, and the like), all of which may be appropriately interconnected by a system bus 142. While not shown, the server 114 may include any appropriate number and arrangement of interfaces that may facilitate interconnection between the system bus 142 and the various components of the server 114 (e.g., storage interface, video interface) and/or other devices (e.g., network interface).

As shown, the memory 126 may include a number of programs or modules (for execution by the processing unit 130) such as an operating system 146 (e.g., Microsoft® Windows® 7), a data collection module 150 for coordinating retrieval of MMP information from the one or more disparate information sources 118, a MMP database builder 154 for building one or more databases of various MMP and related holding metrics, an analysis module 158 for retrieving data corresponding to one or more actual or hypothetical user accounts including one or more MMPs and providing numerous analytics on the retrieved information, and/or one or more other programs or modules 162. The various protocols, modules, builders, and the like discussed herein may be embodied in the form of any appropriate number and/or arrangement of computer-readable instructions, scripts, threads, and the like.

The data collection module 150 may generally coordinate the access and retrieval of MMP and related holding information from one or more information sources 118 (e.g., via their respective websites) in any appropriate manner and subsequent storage of such information in a MMP data store 166 of storage arrangement 134. In one arrangement, the data collection module 150 may attend to crawling or spidering the Web in any appropriate periodic manner for MMP and related holding information from the one or more information sources 118. In another arrangement, the data collection module 150 may coordinate to have the one or more information sources 118 pass MMP and related holding information to the server 114 in any appropriate manner (e.g., periodic, whenever updated information exists, etc.). In a further arrangement, the data collection module 150 may directly communicate with the one or more information sources and request any desired information. In any case, the one or more information sources 118 may include financial information providers 168 (e.g., iMoneyNet, Bloomberg, Reuters), MMP companies 170 (and/or their respective sponsors, corporate parents, etc.), investment services providers 174 (e.g., Goldman Sachs, Morgan Stanley), and/or other information sources 178.

FIGS. 2-4 illustrate various data structures 200, 300, 400 which may be used to organize MMP and related holding information collected or received from one or more of the information sources 118. The data structure 200, 300, 400 (and other data structures disclosed herein) may form part of a larger database 167 (e.g., associated with a RDBMS) that is stored in MMP data store 166 (see FIG. 1) and may be searchable and/or otherwise accessible by various other system components and/or processes (e.g., by MMP database builder 154, analysis module 158, client devices 122, and/or the like). While various types of information will be illustrated and discussed in relation to the various data structures, more, less and/or different types of information are also encompassed within the present disclosure.

Figure 5:
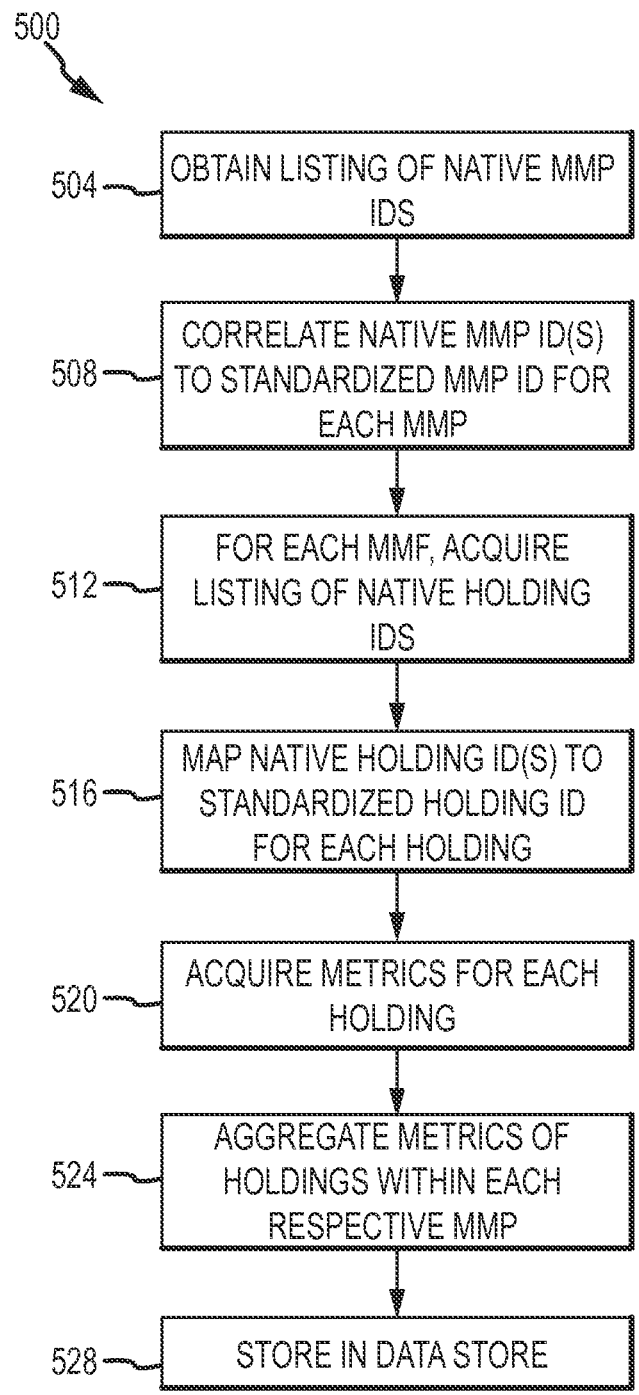
FIG. 5 is a protocol that may be used to build or maintain the one or more database of FIG. 1.

FIG. 5 illustrates one embodiment of a protocol 500 that may be utilized to obtain MMP and related holding information from one or more information sources 118 and build, maintain and/or update one or more data structures of the database 167. The data collection module 150 and MMP database builder 154, for instance, may represent or be represented by one or more steps of the protocol 500. In any event, the protocol 500 may include obtaining 504 a listing of native MMP IDs (e.g., ticker symbol, an International Securities Identification Number (ISIN), a Committee on Uniform Securities Identification Procedures (CUSIP) number, and/or a Stock Exchange Daily Official List (SEDOL) identifier) corresponding to one or more MMPs from one or more of the information sources 118 (e.g., from financial information providers 168).

Turning to FIG. 2, the data structure 200 may include a number of columns such as MMP name column 204, native ID column 208, standard ID column 212, holding name column 216, size column 220, yield column 224, weighted average maturity (WAM) column 228, MMP company column 232 and/or MMP parent column 236 as well as a number of rows such as $MMP_1$ row 240, $MMP_2$ row 244, $MMP_3$ row 248, and/or additional rows up to a row 250 corresponding to $MMP_n$. In the case of $MMP_1$ for instance, various native MMP IDs may be collected such as $NID_1$, $NID_2$ and $NID_3$, all of which correspond to $MMP_1$ (see native ID column 208). Native MMP IDs may also be obtained for a number of additional MMPs (such as $MMP_2$ and $MMP_3$). After collection of the native MMP IDs, the protocol 500 may correlate 508 the native MMP IDs to a standard MMP ID for each of the MMPs. As shown in standard ID column 212, $MMP_1$, $MMP_2$ and $MMP_3$ may be respectively correlated with or mapped to $STD\ ID_1$, $STD\ ID_2$ and $STD\ ID_3$. For instance, each of the standard MMP IDs may be in the form of a ticker symbol which may be used to trade shares in $MMP_1$, $MMP_2$ or $MMP_3$ on a trading platform or portal. Alternative and/or additional forms of standard IDs are also envisioned.

The protocol 500 may also include acquiring 512 a listing of native holding IDs (e.g., ticker symbols, ISIN, CUSIP, SEDOL, names and/or the like) for the various holdings or securities held by each of the MMPs. For instance, the server 114 may obtain the listing directly from the MMP companies 170 (via websites administered by the MMP companies) and/or from another information source 118 that has obtained the listing directly or indirectly from the MMP companies 170.

Turning to FIGS. 3 and 4, the data structures 300, 400 illustrate the holdings held by $MMP_1$ (e.g., $H_1$, $H_2$, $H_4$, $H_5$) and the holdings held by $MMP_2$ (e.g., $H_2$, $H_4$, $H_6$). For instance, the data structures 300, 400 may include a number of columns such as a holding name column 304, 404, native holding ID column 308, 408, standard holding ID column 312, 412, type column 316, 416, par column 320, 420, % weight column 322, 422, maturity date column 324, 424, sponsor column 328, 428 and/or issuer column 332, 432. Furthermore, the data structure 300 may include a number of rows corresponding to the various holdings held by $MMP_1$ such as $H_1$ row 336, $H_2$ row 340, $H_4$ row 344 and $H_5$ row 348 and the data structure 400 may include a number of rows corresponding to the various holdings held by $MMP_2$ such as $H_2$ row 436, $H_4$ row 440 and $H_6$ row 444. In the case of holding $H_1$ of $MMP_1$ for instance, one or more native holding IDs such as $NID_{12}$ and/or $NID_{14}$ may be obtained.

Once one or more native holding IDs have been obtained for each of the holdings of each of the MMPs, all of the native holding IDs for a particular holding may be mapped 516 to a common standard holding ID for that holding in any appropriate manner (e.g., manually by a subject matter expert, automatically via a text recognition tool, and/or the like). For instance, with reference to $H_2$ row 340 in FIG. 3 and $H_2$ row 436 in FIG. 4, the native holding ID $NID_{24}$ may be obtained during the step 512 of acquiring the listing of native holding IDs for $MMP_1$ while native holding ID $NID_{38}$ may be obtained during the step 512 of acquiring the listing of native holding IDs for $MMP_2$. As each of native holding ID $NID_{24}$ and $NID_{38}$ refer to the same holding (i.e., $H_2$), both of these native holding IDs may be mapped to the standard holding ID $STD\ ID_{101}$ (see STD ID columns 312, 412). A similar process may be performed for the other holdings of the various MMPs. It should be appreciated how the holding $H_2$ in $MMP_1$ and the holding $H_2$ in $MMP_2$ may each be considered an "instance" of the underlying holding $H_2$ (e.g., of the underlying bond, ABCP, etc.). In any event, this mapping between native and standard holding IDs can allow the server 114 (e.g., analysis module 158) to identify one or more holdings that form part of two or more MMPs of an account or accounts even if the same holding is associated with two or more different IDs, and then perform numerous types of analytics on the one or more holdings.

Continuing, the protocol 500 may also include acquiring 520 metrics for each of the holdings of the various MMPs. Metrics may include almost any information operable to identify and/or describe one or more characteristics of a particular holding or an MMP as a whole. Turning to columns 316-332, 416-432 of the data structures 300, 400 of FIGS. 3 and 4, representative metrics may include a type or category of holding (e.g., REPO, ABCP, etc.), par value for the holding, percent of total MMP value represented by the holding, maturity date, sponsor, and/or issuer.

Once holding metrics are acquired, various types of metrics of the holdings within one or more particular MMPs may be aggregated 524. For instance, and turning back to data structure 200 of FIG. 2, a time to maturity (e.g., in days) may be determined for each of the holdings of $MMP_1$ (i.e., for holdings $H_1$, $H_2$, $H_4$, $H_5$) from a current date, and then a weighted average maturity (WAM) may be determined for $MMP_1$ from the maturity lengths of holdings $H_1$, $H_2$, $H_4$ and $H_5$ and stored in WAM column 228. Numerous other examples of metric aggregation among the holdings of a particular MMP are envisioned and encompassed within the present disclosure (e.g., average yields, total holdings under management, etc.).

The metrics disposed within the various data structures (e.g., data structures 200, 300, 400) of the databases disclosed herein may not necessarily be obtained from one or more "aggregation"-type information sources such as financial information providers 168, MMP companies 170 and investment services providers 174. For instance, the modules and other tools disclosed herein may be able to determine or obtain particular metrics from other metrics (e.g., such as WAM as disclosed above) or may be able to obtain metrics that are not readily available by such aggregation-type information sources (e.g., obtain a domicile nation of a holding sponsor or issuer). In this regard, the modules and tools disclosed herein may be operable to enrich those metrics obtain from financial information providers 168, MMP companies 170 and investment services providers 174 with additional metrics for use by treasurers.

It should be understood that the various steps of the protocol 500 of FIG. 5 (as well as other protocols and methods disclosed herein) have been shown in a particular order merely for purposes of illustration and that, unless otherwise specified, such steps may be performed in orders different than those shown and described herein. For instance, while the protocol 500 includes storing 528 the aggregated metrics in a data store (e.g., MMP data store 166) after metrics have often aggregated within each respective MMP, it should be appreciated that the storing step 428 may occur after one or more of the other steps of the protocol 500 as well. Furthermore, it should be appreciated that the MMPs in FIGS. 2-4 have been illustrated as each including only a few holdings merely for purposes of ease of discussion and that each MMP may in reality include more than a few holdings (e.g., 50, 100, or more).

The various data structures 200, 300, 400 of the database 167 may be appropriately interconnected such that updates or changes occurring in one of the data structures automatically apply to other data structures. In the previous example for instance, a change to the maturity date column 424 for $H_2$ row 436 for $MMP_2$ may automatically cause a redetermination of the WAM value (in WAM column 228) for any MMP that includes holding $H_2$ (i.e., as illustrated, for $MMP_1$ and $MMP_2$). As another example, upon receiving an updated listing of holdings for $MMP_2$ that does not include native ID $NID_{44}$ and $NID_{22}$ corresponding to holding $H_6$, any metrics corresponding to $H_2$ for $MMP_2$ can be removed from the data structures 200, 300, 400. Furthermore, numerous other types of data structures are envisioned and are encompassed within the scope of the present disclosure, some of which may be stored in other data store 180. The various steps of the protocol 500 may be repeatedly performed in any appropriate manner (e.g., according to a periodic schedule, when new or updated information is available, and/or the like) to maintain substantially current and accurate metrics. In this manner, corporate treasurers and other users can utilize substantially update to date and/or accurate metrics when performing a credit risk exposure analysis and/or other analyses, as will be described in more detail below.

Turning back to FIG. 1, users (e.g., corporate treasurers, other investors) may access MMP and related holding or holding information of the server 114 for use in performing one or more analyses via one or more client devices 122 that are in communication with the server 114 via one or more networks 125. Each client device 122 may be of any appropriate form (e.g., laptop, desktop, tablet, smartphone) and may include memory 182 (e.g., one or more RAM or other volatile memory modules), a processing unit 186 (e.g., one or more CPUs) for executing computer readable instructions from the memory 182, storage 190 (e.g., one or more magnetic disks or other non-volatile memory modules), and/or a number of other components 192 (e.g., input devices such as a keyboard and mouse, output devices such as a display and speakers, and the like), all of which may be appropriately interconnected by a system bus 191 (all of which have only been shown for one of the client devices 122 in the interest of clarity). While not shown, each client device 122 may include any appropriate number and arrangement of interfaces that may facilitate interconnection between the system bus 191 and the various components of the client device 122 (e.g., storage interface, video interface) and/or other devices (e.g., network interface) such as server 114.

The memory 182 may include a number of programs or modules (for execution by the processing unit 186) such as an operating system 193 (e.g., Microsoft® Windows® 7), a browser 193 for retrieving and presenting MMP and related holding information and analytics from server 114 on a display, and/or one or more other programs or modules 195. In one arrangement, any appropriate program such as MMP platform or portal 198 may execute on server 114 and be accessible by browser 194 of client device 122 for use in performing one or more analytics on MMP and/or related holding information, executing trades of one or more MMPs, and the like. While the MMP portal 198 is shown as being within memory 126 and in communication with but separate from the analysis module 158, MMP database builder 154, data collection module 150, it is also contemplated that the MMP portal 198 could include or encompass one or more of the aforementioned builders and modules (i.e., the builder and modules could be component programs of a larger program such as the MMP portal 198). Representative screen shots of the MMP portal 198 will be discussed in later figures. In another arrangement, and instead of browser 194, any appropriate desktop client may be installed on the client device 122 and may function to perform one or more various analytics related to the MMP and/or related holding information.

A user may use client device 122 to access server 114 (e.g., via the MMP portal 198) and establish one or more actual or hypothetical (i.e., sample) financial accounts (each including one or more MMPs) for storage in user data store 169 of storage 134 and for use in performing analytics, executing trades of MMPs, and/or the like. It is envisioned that the details of the accounts (i.e., the MMPs, the particular number of shares of the MMPs, etc.) may be manually entered by the user and/or may be retrieved from one or more other sources (e.g., from investment services providers 174) by the server 114 on behalf of the user. In the latter regard, for instance, the user may need to supply appropriate credentials (e.g., login or username, password, etc.) to the server for use in gaining access to the details of already established accounts that the user has at such investment service providers 174. One or more of the various accounts that a user has established with the server 114 may be considered the user's assets under management (AUM). In addition to the various accounts, a user may be able to establish one or more internal (e.g., according to intraorganization standards) and/or external (e.g., according to any appropriate "Best Practices") guidelines with the server 114 against which the analysis module 158 can measure one or more metrics or analytics of the AUM for compliance. Any appropriate MMP and/or related holding data and/or analytics may be appropriately stored in storage 190 (e.g., via exporting to a spreadsheet) for local use.

Turning briefly to FIG. 6, a data structure 600 is shown that includes customer information for a number of customers that have established accounts on the server 114. The data structure 600 may include a number of columns such as a customer ID column 604, an accounts column 608 and an MMPs column 612 along with a number of rows corresponding to various customers such as $customer_1$ row 616, $customer_2$ row 620, $customer_3$ row 624, and/or one or more additional rows up to a $customer_n$ row 628. The data structure 600 may form part of a database 171 (e.g., associated with a RDBMS) in user data store 169 that is utilized by server 114 to manage a number of customer accounts and their respective MMPs. Similar to the database 167 in MMP data store 166, the database 171 may include numerous additional data structures (e.g., data structures specific to particular customers, data structures specific to particular accounts, etc.), all of which may be in appropriate communication. Furthermore, various modules and components of the server 114 (e.g., processing unit 130, analysis module 158, etc.) may readily access the data in MMP and user data stores 166, 169 and pass data between the same as appropriate (e.g., retrieving MMP and related holding metrics from database 167 of MMP data store 166 and populating appropriate fields in database 171 of user data store 169).

Figure 7:
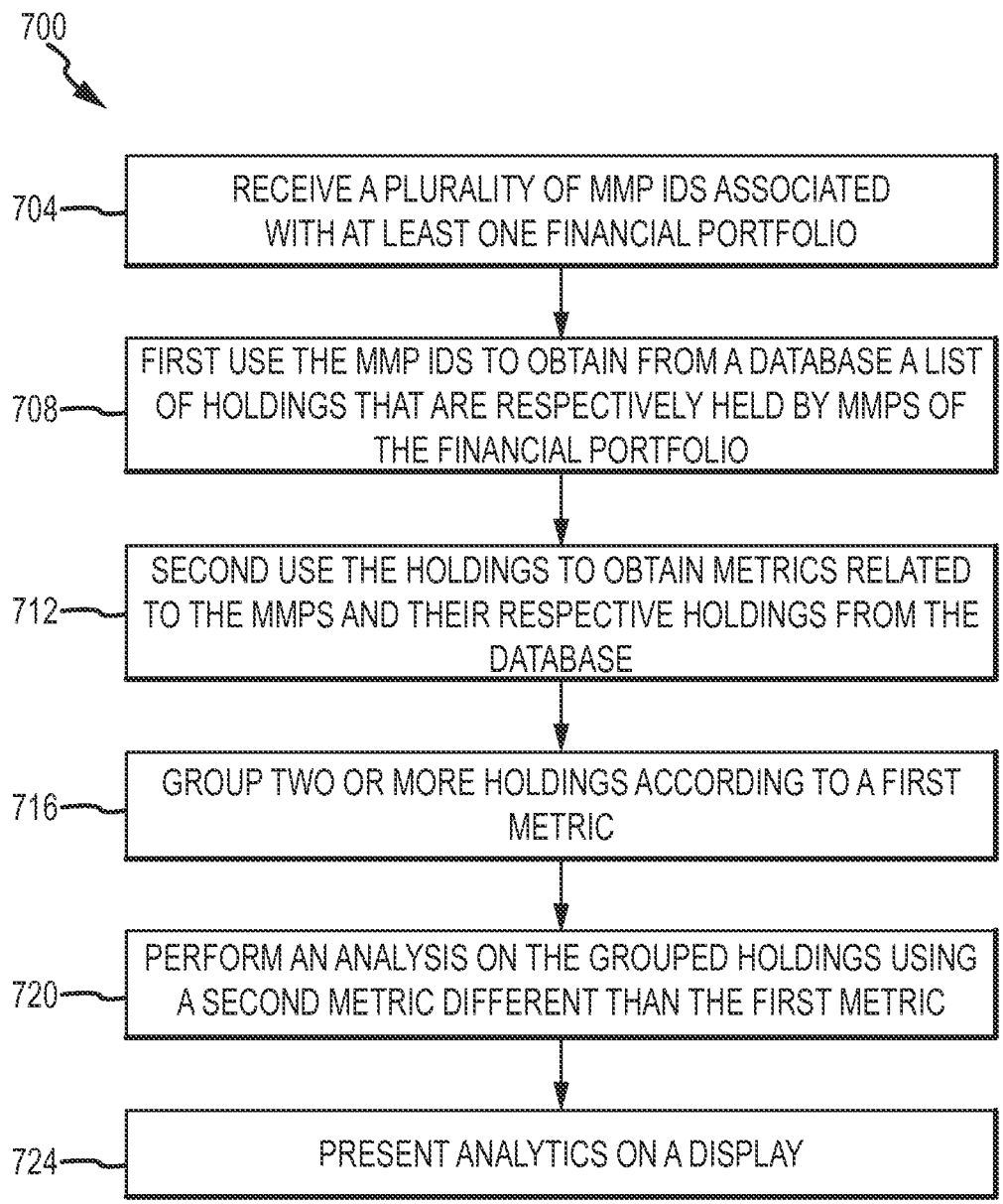
FIG. 7 is a protocol that may be used to perform one or more types of analytics on the FIP (e.g., a money market product) and related holding metrics of a user's financial account(s).

FIG. 7 illustrates a protocol 700 that may be utilized to perform analytics on the MMPs of one or more user accounts of an AUM and present such analytics on a display. The analysis module 158 may, for instance, represent and/or be represented by one or more steps of the protocol 700. While discussing various steps that may be included as part of the protocol 700, reference will be made to the schematic illustration presented in FIG. 8 which shows a number of user accounts with hypothetical MMP allocations, fund holdings, and the like. At 704, a plurality of MMP IDs associated with an AUM may be received from and/or stored in user data store 169 of server 114. As discussed previously, the MMP IDs may be in the form of native MMP IDs that may be mapped to a standard MMP ID for each MMP using the database 167 (e.g., see data structure 200 in FIG. 2). In some cases, the standard MMP ID may simply be the name of the MMP. In any case, the protocol 700 may proceed to use 708 the received MMP IDs to obtain from the database 167 a list of holdings (e.g., as identified by their respective native and/or standard holding IDs) that are held by each of the various MMPs, and then use 712 the MMPs (e.g., their respective standard MMP IDs) and/or holdings (e.g., their respective standard holding IDs) to obtain metrics related to the MMPs and/or holdings (e.g., total asset value of an MMP, percent of a particular MMP represented by a particular holding, yields, and the like).

At this point, numerous analytics may be executed on the various metrics and corresponding results may be graphically presented on a display of client device 122 for use and/or decision-making by corporate treasurers and/or other investors. In the scenario illustrated in FIG. 8, a particular user's AUM 800 includes $account\ block_1$ 804 that invests $\$x_1$ in $MMP_1$ (which may not necessarily be related to the specific MMPs discussed in FIGS. 2-4, along with the other MMPs illustrated in FIG. 8) and $\$y_1$ in $MMP_2$, $account\ block_2$ 808 that invests $\$x_2$ in $MMP_1$ and $\$y_2$ in $MMP_3$, and $account\ block_3$ 812 that invests $\$x_3$ in $MMP_2$ and $\$y_3$ in $MMP_3$. As also shown, this scenario includes $MMP_1$ holding percentage block 816 illustrating that 30% is invested in holding $H_1$ and 70% is invested in holding $H_2$, $MMP_2$ holding percentage block 820 illustrating that 60% is invested in $H_2$ and 40% is invested in $H_3$, and $MMP_3$ holding percentage block 824 illustrating that 80% is invested in $H_1$ and 20% is invested in $H_2$.

With reference at least to the $MMP_1$, $MMP_2$ and $MMP_3$ blocks 816, 820, 824 and the ensuing discussion, it can and will be seen that users can more accurately gauge actual credit exposure in money markets by breaking MMPs down into their component holdings (or their holding instances) and analyzing the holdings across the various MMPs (i.e., instead of merely considering the various types of MMPs that an AUM is invested in or merely considering the amount of security overlap between two or more portfolios or MMPs) in a number of manners. It should be appreciated that the various features of FIG. 8 (i.e., the blocks, buckets, etc.) are merely for illustration to assist the reader in understanding the teachings presented herein and that that various information shown in the features may be stored in one or more data structures and/or databases and stored in any appropriate data store or storage (e.g., as shown in FIGS. 1-4).

Turning to FIG. 7, the protocol 700 may begin to perform one type of analysis by grouping 716 two or more holdings according to a first metric and then performing 720 an analysis on the grouped holdings using a second metric different than the first metric. In one arrangement, the first metric by which the two or more holdings are grouped may be the identifying data (e.g., standard holding IDs) of the holdings, and the analysis may entail aggregating other metrics of the grouped holdings. For instance, two holdings may have different native holding IDs but the same standard holding ID which indicates that the two holdings are in fact referring to the same holding (e.g., see native holding ID $NID_{24}$ of $MMP_1$ and native holding ID $NID_{38}$ of $MMP_2$ in FIGS. 3 and 4). In some amendments, two holdings from different MMPs but having common identifying data may be considered "instances" of the underlying holding (i.e., the underlying CDS, ABCP, bond, etc.).

Figure 8:
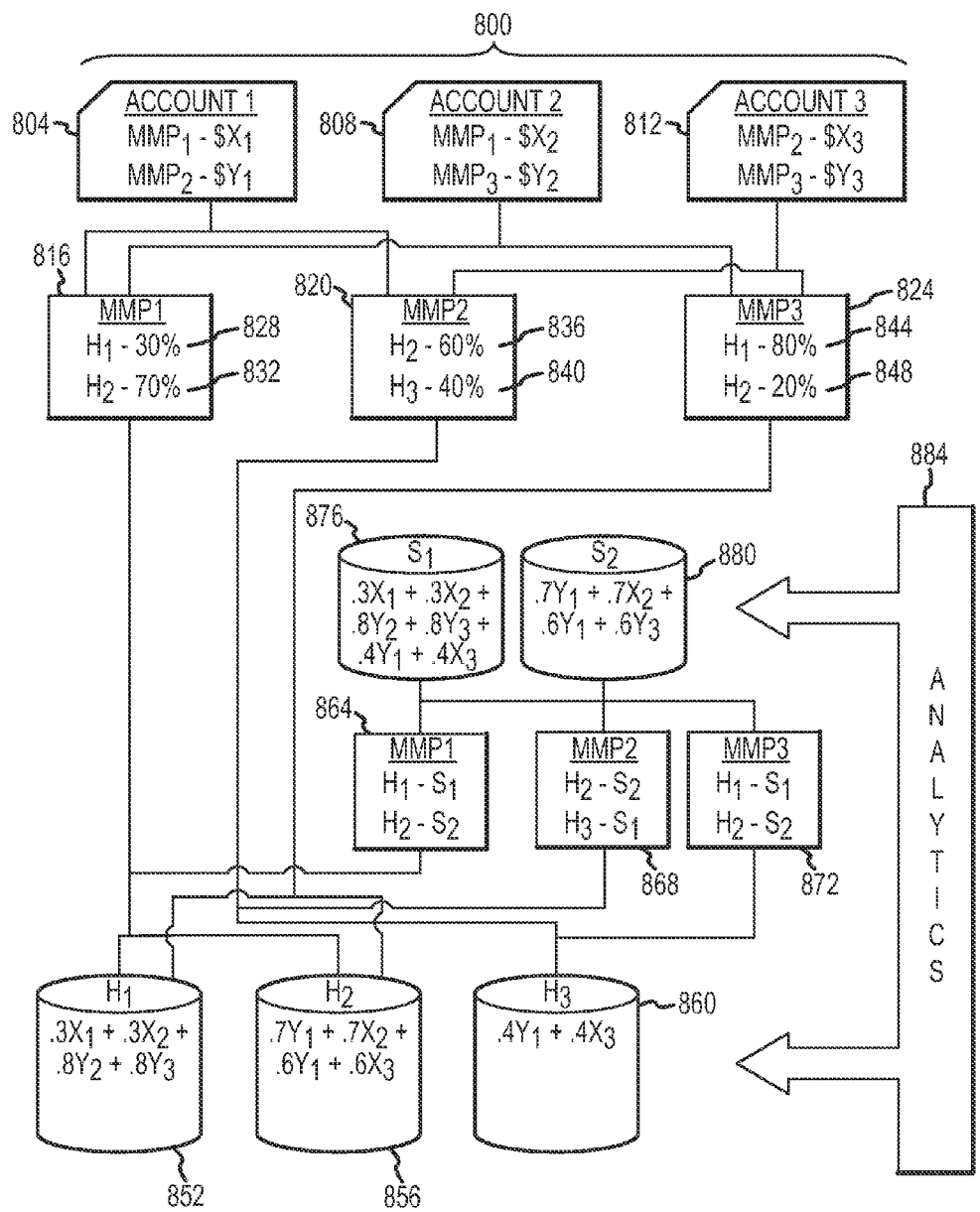
FIG. 8 is block diagram illustrating a process of breaking an AUM into its respective accounts, breaking the accounts into their respective FIPs (e.g., MMPs) breaking the FIPs into their respective underlying securities or holdings, and then grouping the holdings and performing analyses on the grouped holdings in numerous manners.

With reference to FIG. 8, step 716 of the protocol 700 of FIG. 7 may include grouping first and second instances 828, 844 of holding $H_1$ into a holding $H_1$ bucket 852 and/or grouping, first, second and third instances 832, 836, 848 of holding $H_2$ into a holding $H_2$ bucket 856. In some arrangements, single instances of holdings (e.g., single instance 840 of holding H3) may be placed in buckets (e.g., single instance 840 may be placed in holding $H_3$ bucket 860). However, assuming the single instance of the holding forms part of an MMP that is held by two or more accounts of an AUM (as is instance 840 of holding H$_3$), then such a single instance of a holding may in actuality have multiple instances when considered across multiple accounts and with respect to the AUM 800 as a whole.

Once the various holding instances have been grouped together, one or more analytics 884 may be performed 720 on the grouped holding instances using at least a second metric different than the first metric. For instance, the second metric may be a holding instance value in currency (e.g., in US dollars) or as a percentage of AUM asset value, and the analysis may include aggregating (e.g., summing) the asset values of each of the holding instances to determine a combined holding value and thus the true portion of the underlying holding held by the AUM. Turning to FIG. 8, an analysis may include determining the exposure the AUM 800 has to holding H$_1$ by way of summing the asset values of each of the instances of holding H$_1$. For instance, the asset value of first H$_1$ instance 828 can be obtained by multiplying the percentage of MMP$_1$ invested in holding H$_1$ (i.e., 30% in this example) by the currency value that each account has invested in MMP$_1$ (i.e., by $x_1$ and by $x_2$) and summing the two values ($0.3x_1+0.3x_2$). Similarly, the asset value of second H$_1$ instance 844 can be obtained by multiplying the percentage of MMP$_3$ invested in holding H$_1$ (i.e., 80% in this example) by the currency value that each account has invested in MMP$_3$ (i.e., by $y_2$ and by $y_3$) and summing the two values ($0.8y_2+0.8y_3$).

As shown in the holding H$_1$ bucket 852, the total value in currency of holding H$_1$ held by the AUM 800 may be obtained by summing the values of the first and second instances 828, 844 of holding H$_1$ which in this example is $0.3x_1+0.3x_2+0.8y_2+0.8y_3$. The total value of H$_1$ held by the AUM 800 may be graphically presented 724 on a display of client device 22 in numerous manners (e.g., pie charts, bar graphs, etc.). A similar process may be performed for the other holding instances to obtain values of the other holdings held by the AUM (e.g., see summed values in holding H$_2$ bucket and holding H$_3$ bucket 856, 860).

The various types of analyses that may be collectively performed on holdings (i.e., instances of a holding) of an AUM are not limited to doing so on groups (e.g., buckets) of holdings or holding instances that share the same identifying data (e.g., the same native and/or standard holding IDs, e.g., the same ticker symbols). In another arrangement, the first metric by which holdings may be grouped may be at least one of a sponsor, issuer, domicile nation and category of the holdings. Returning to FIG. 8 and with reference to MMP$_1$, MMP$_2$ and MMP$_3$ holding sponsor blocks 864, 868, 872, holdings H$_1$ and H$_3$ are associated with sponsor S$_1$ and holding H$_2$ is associated with sponsor S$_2$. In this regard, a user may wish to group holdings and/or their instances according to holding sponsor, and then perform 720 one or more analytics 884 on the grouped holdings. For instance, the asset values of both holding H$_1$ and holding H$_3$ may be summed to convey a total asset value invested in sponsor S$_1$ by the AUM (here, the value invested in H$_1$ or $3x_1+0.3x_2+0.8y_2+0.8y_3$ plus the value invested in H$_3$ or $0.4y_1+0.4x_3$). See sponsor S$_1$ bucket 876. A similar process may be performed for other sponsors represented in the AUM 800 (e.g., see sponsor S$_2$ bucket 880). When first and second holdings that have different respective first and second issuers, domicile nations, etc. are controlled or managed by the same sponsor, grouping and analyzing holdings by sponsor may in some situations provide a more accurate credit exposure picture for corporate treasurers and other investors.

The present disclosure thus contemplates not only substantially "linear" analyses of AUMs (e.g., breaking an AUM down into a number of accounts, breaking the accounts down into a number of MMPs, breaking the MMPs down into a number of holdings, and then performing a number of analyses on groups of common holdings or common holding instances, such as plurality of shares or holdings in a particular CDS or ABCP), but also substantially "non-linear" analyses of AUMs. That is, while AUMs can be broken down into holdings as just described for use in performing numerous useful analyses, the holdings can be "re-grouped" in a number of manners other than merely according to holding ID (e.g., such as by sponsor, domicile nation, etc.) and then reanalyzed to obtain different types of information which may be used by corporate treasurers to gauge credit exposure, make trading decisions, and the like. In some arrangements, the substantial linear analysis may proceed directly to a breakdown or grouping of holdings according to sponsor, domicile nation, etc instead of first bucketing holdings according to common holding IDs and then re-bucketing according to other metrics such as sponsor and the like.

Turning now to FIG. 9, a screenshot 900 of MMP portal 198 (shown in FIG. 1) is illustrated for allowing a user to access, view and manipulate on a display of client device 128 the various functionalities disclosed herein. The MMP portal 198 may be in appropriate communication with the MMP and user data stores 166, 169 (see FIG. 1) to acquire information as needed, the analysis module 158 to obtain analytical results, and the like. The screenshot 900 may be presented to a user after the user has accessed the MMP portal 198 via browser 194 over network 125 and entered any appropriate credentials (e.g., user name, password).

As shown, the screenshot 900 may include a listing or matrix 904 of various MMPs that are available for analysis in a number of manners. The matrix 904 may include a number of rows 908 each representing a particular MMP and a number of columns 912 at least some of which represent corresponding metrics of the MMPs. In this screenshot 900, the use of the term "HOLDINGS" near the top left corner of the matrix 904 is meant to connote MMPs (e.g., in the sense of being "holdings" or hypothetical holdings of an account or AUM) instead of the underlying holdings/securities making up an MMP (such as a CD, bond, etc.). In any event, the metrics shown in the matrix 904 may include at least some information similar to that shown in data structure 200 of FIG. 2 (e.g., MMP name, tickers/IDs, yields, and the like).

To perform a collective analysis on a number of different MMPs, a user may select such MMPs in any appropriate manner, such as by marking a checkbox 916 in the particular MMPs (e.g., with a mouse, finger on a touch screen, etc.), and thereafter manipulate button 920. In some arrangements, the screenshot 900 may include a search cell 920 and a user manipulable feature such as a drop-down menu 922 that collectively allow a user to search for funds in a number of manners such as by ticker symbol, by sponsors of the underlying holdings of the funds, etc. For instance, upon a user selecting "sponsor" in drop-down menu 922 as shown in FIG. 9, entering "BNP Paribas" in the search cell 920, and clicking or manipulating button 924, a user may be presented with a display of MMPs and metrics corresponding to those MMPs having one or more holdings for which BNP Paribas is a sponsor. As another example, a user could select "country" in the drop-down menu 922 and enter "Spain" in the search cell 920 to obtain a display of MMPs and metrics corresponding to those MMPs having one or more holdings for which Spain is a domicile nation.

In some arrangements, another drop-down menu 922 (or other user manipulable feature) may be provided that includes specific search parameters that in some cases may be user-defined. For instance, it is envisioned that the screenshot 900 could have a "sponsor" drop-down menu 922, "country" drop-down menu 922, a "region" drop-down menu, and the like, whereby such drop-down menus 922 could respectively have a number of sponsors (e.g., BNP Paribas, Federal Home Loan Banks, etc.), countries (e.g., Spain, France, Australia, etc.), and regions (e.g., South America, PIIGS, etc.) for selection by a user. A user may also be able to configure customer drop-down menus 922 or other features (e.g., buttons) that may be manipulable by the user as desired (e.g., creating one or more groups of specific countries). In some arrangements, two or more of such search parameters may be combined. In other arrangements, each of the resultant MMPs displayed may have a corresponding user manipulable feature (e.g., expand/collapse button) that, when manipulated, displays the underlying holdings of the MMPs.

The collective analysis is not limited merely to a user manually selecting a number of particular MMPs and/or search parameters as just described. For instance, the data of a user's previously created actual or sample account(s) or AUM(s) may be automatically passed to or imported from MMP portal 198 for an analytical display thereof. In one arrangement, the current account(s) or AUM(s) may serve as baseline against which to compare various "what if" type scenarios. For instance, the user may be able to do a "save as" of the imported actual account(s) or AUM(s) as "Scenario A," "Scenario B," etc., and subsequently make changes to the account(s) or AUM(s) (e.g., in terms of invested values, MMPs, etc.). As will be discussed more fully below, each of the current and what-if type accounts or AUMs can be compared against any appropriate internal and/or external guidelines to check for compliance with such guidelines. In any case, it should be understood that the manual selection of MMPs for analysis is for purposes of illustration and that the present disclosure is not limited to such selection.

Figure 10:
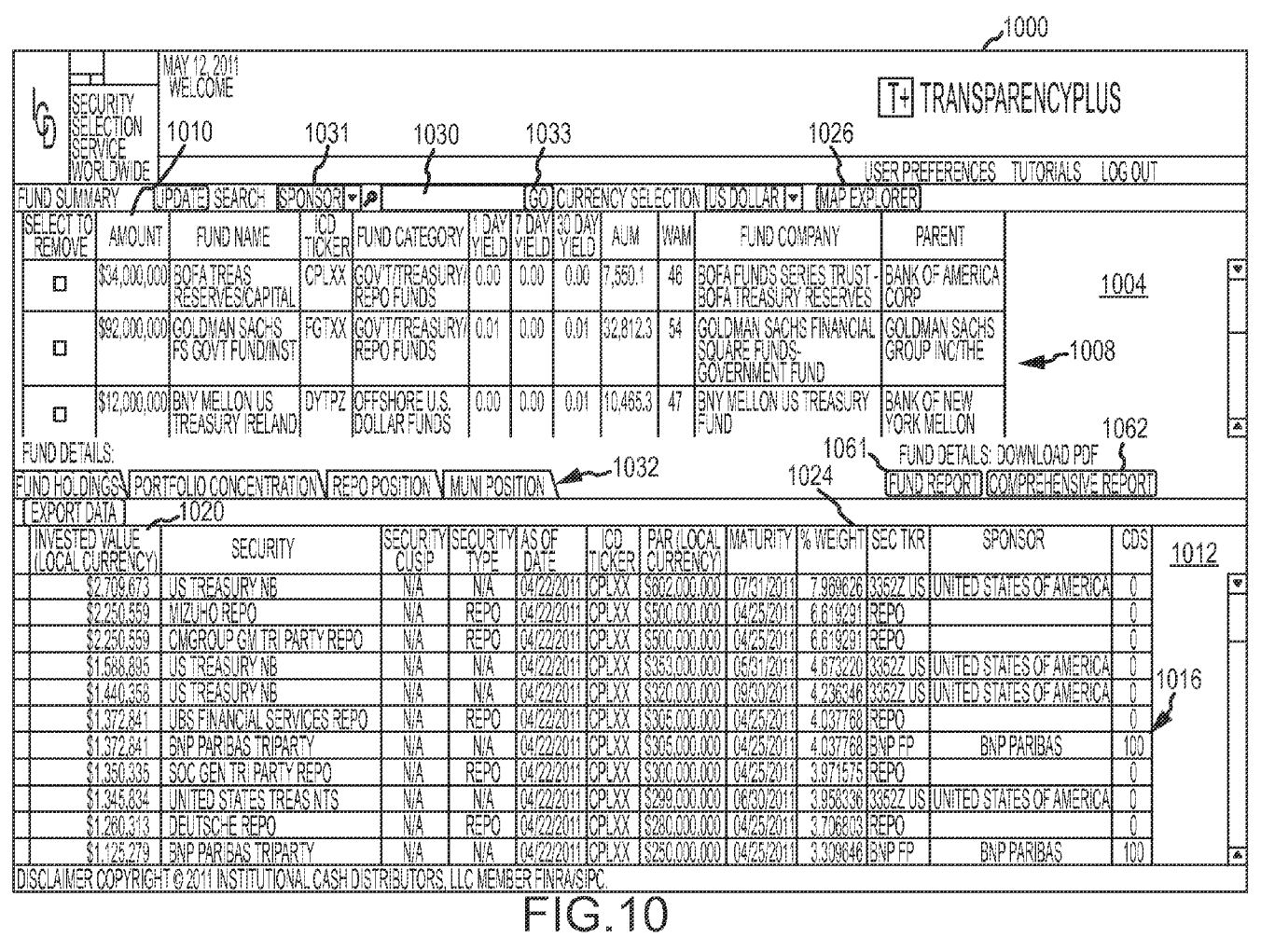

Turning to FIG. 10, another screenshot 1000 may be presented upon a user selecting a number of MMPs for analysis. A first portion 1004 of the screenshot 1000 may include a matrix 1008 with information similar to the matrix 904 of FIG. 9 but including only the MMPs that are to be analyzed. As shown, one of the columns of the matrix 1008 may be an "amount" column 1010 that allows a user to enter a currency amount (e.g., in U.S. Dollars, Euros, Pounds Sterling, etc.) to invest in each of the MMPs. In some arrangements, the cells in the amount column 1010 may be automatically populated with investment amounts from the user's accounts (e.g., as stored in user data store 169). In further arrangements, the automatically populated cells may also be edited by the user in the screenshot 1000.

The screenshot 1000 may also include a second portion 1012 including a matrix 1016 made up of metrics for each holding/security of each of the MMPs illustrated in the first portion 1004. For instance, upon selecting the MMPs in screenshot 900 of FIG. 9 to be included as part of an analysis, the analysis module 158 may retrieve corresponding security and metric information from database 167 of MMP data store 166 and pass such data to the MMP portal 198 for presentation on a display of client device 128. In some arrangements, one or more portions of MMP and user data stores 166, 169 (e.g., databases 167 and/or 171) may be, upon access to the MMP portal 198, loaded into any appropriate cache or quickly accessible memory or storage location for use by analysis module 158 and/or MMP portal 198. At any rate, the matrix 1016 may include, for instance, at least some of the information shown in the data structures 300, 400 of FIGS. 3-4 for each of the securities (e.g., native holding ID such as "security CUSIP", type, par, maturity date, sponsor, etc.).

One of the columns of the matrix 1016 may be an "invested value" column 1020 that may be automatically populated based on the entries in the cells of the amount column 1010. That is, upon a particular invested amount being entered in column 1010 for one of the MMPs in the first portion 1004, the analysis module 158 may automatically multiply the invested amount by the "percent weight" that each security of the MMP holds in relation to the MMP (e.g., see column 1024) to obtain the effective currency invested in each security of the MMP. In this regard, corporate treasurers can obtain greater transparency into the securities/holdings making up each respective MMP and thus a greater understanding of an AUM's actual credit exposure (i.e., rather than merely considering metrics of each MMP as a whole).

Figure 11:
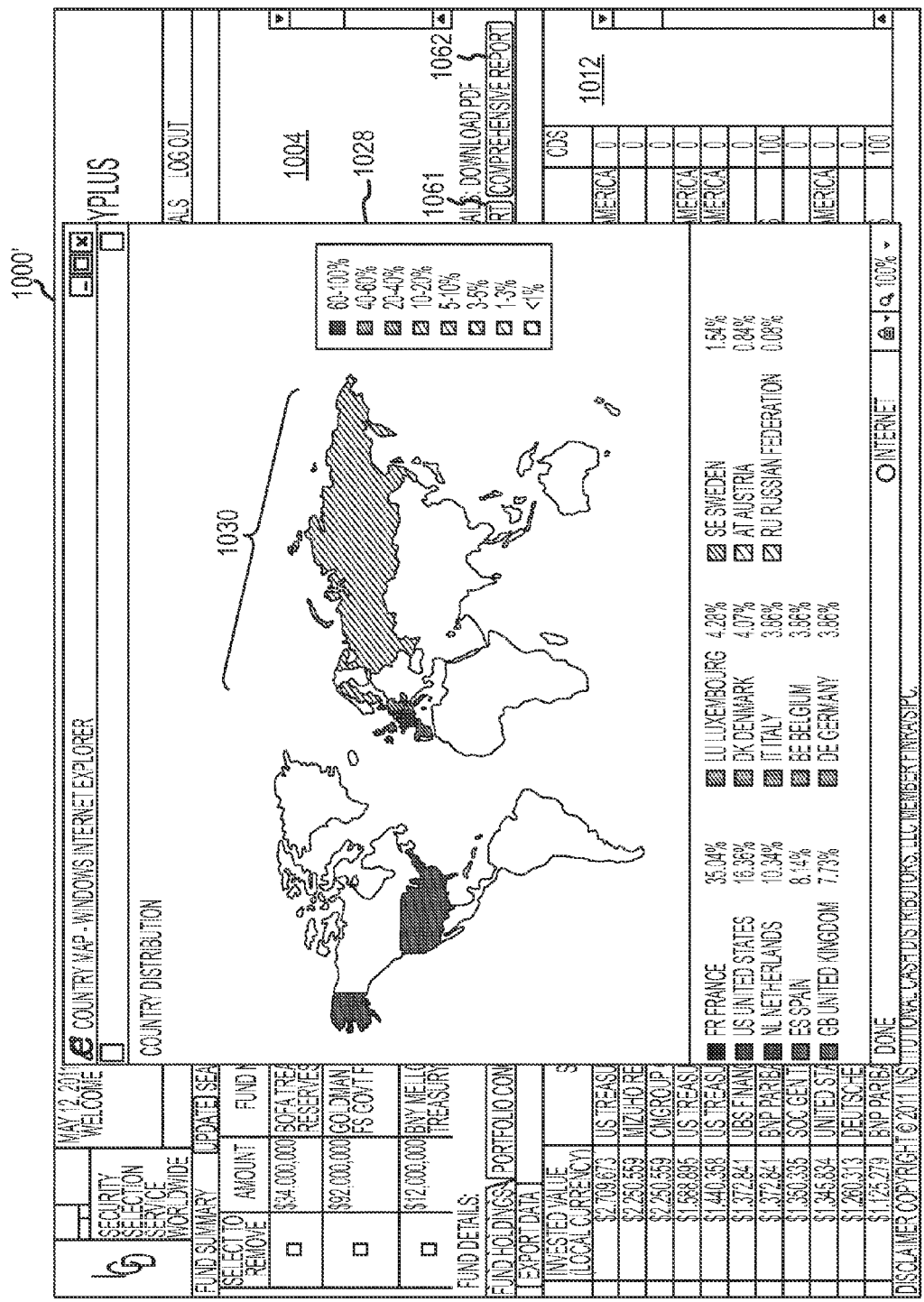

With continued reference to FIG. 10, the screenshot 1000 may include a button 1026 (or other user manipulable feature) that is operable to cause the display of a map that illustrates a geographical distribution of currency invested in the MMPs (e.g., according to country, but other geometrical parameters are also envisioned). Turning now to FIG. 11, another screenshot 1000' is shown after the button 1026 has been appropriately manipulated. This screenshot 1000' includes a pop-up window 1028 with a world map 1030 that may have any appropriate features to convey a relative portion of currency/assets invested in one or more countries. In one arrangement, those countries in which a greater percentage of the securities/holdings underlying the selected MMPs are actually invested (e.g., as measured by the domicile nations of the sponsors of such securities) may be colored darker than other countries (e.g., as shown in FIG. 11, France, the U.S., the Netherlands, etc.).

In this regard, the world map 1030 presents an example of analytics that may be presented on a display as obtained using the protocol 700 of FIG. 7. More specifically, and after a list of holdings and their respective metrics (e.g., as shown in matrix 1012 of FIG. 10) have been obtained 708, 712, the holdings may be grouped 716 according to a first metric (i.e., according to domicile nation or country of respective sponsors). Thereafter, the analysis may be performed 720 on the grouped holdings using a second metric (i.e., invested assets in currency or as a percent of total AUM value) and then the results may be presented 724 on a display in the form of the world map 1030.

With brief reference back to FIG. 10, the screenshot 1000 may in some arrangements include a search cell 1030 and a user manipulable feature such as a drop-down menu 1031 that collectively allow a user to search for MMPs shown in the first portion 1004 and/or their respective securities/holdings in a number of manners such as by sponsor, ticker symbol, security, or country (e.g., see above discussion in relation to FIG. 9). For instance, upon a user selecting "country" in the drop-down menu 1031, entering "France" into the search cell 1030 and manipulating a button 1033, the user may be presented with a display (e.g., in the form of a pop-up window or another screenshot) of those mutual funds from the first portion 1004 that have at least one security associated with a sponsor that is domiciled in France. As discussed in relation to FIG. 9, each of the resultant MMPs displayed may have a corresponding user manipulable feature (e.g., expand/collapse button) that, when manipulated, displays the underlying securities of the MMPs (at least one of which has a sponsor that is domiciled in the searched for country; in this case, France).

Figure 12:
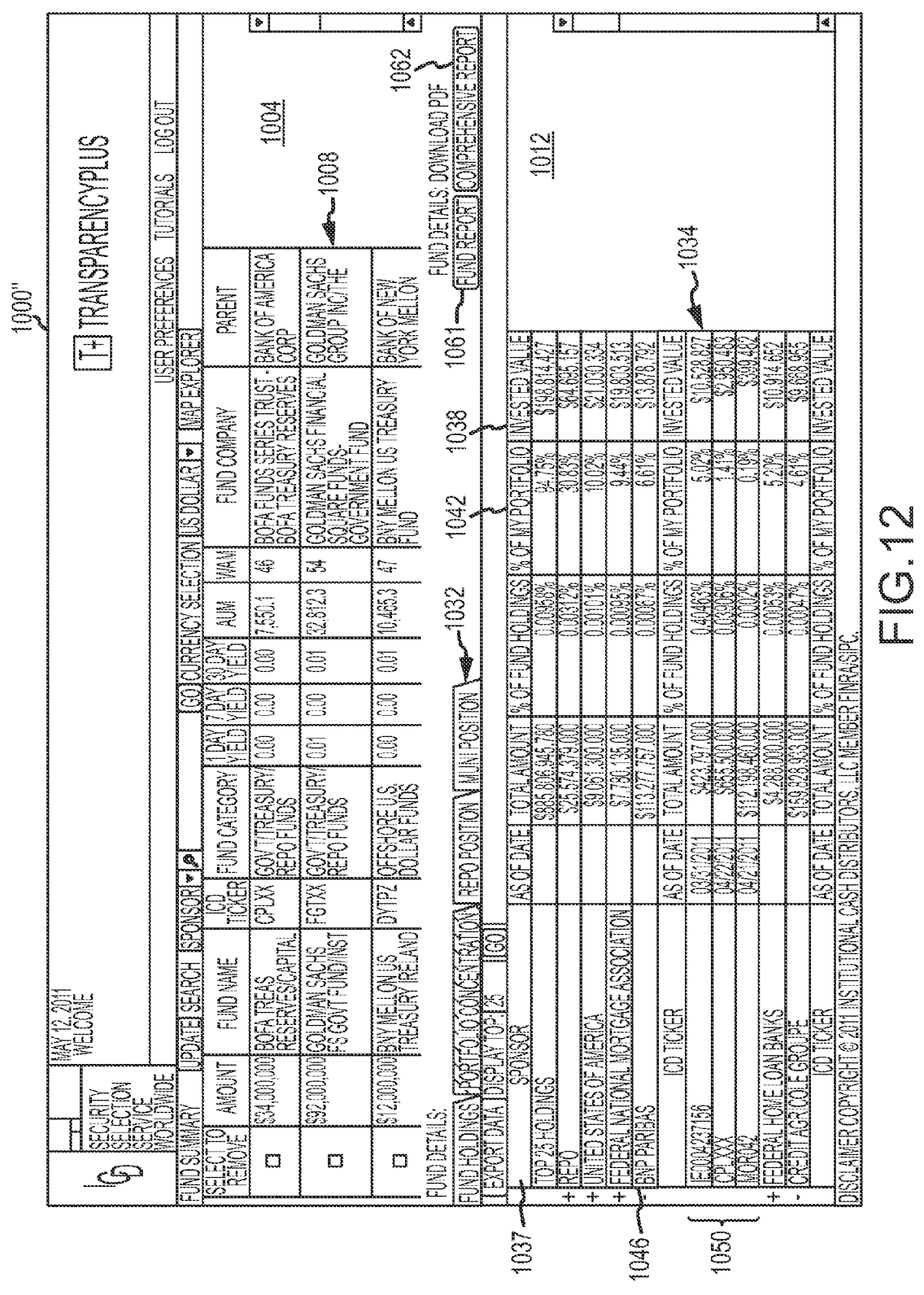

In other arrangements, the screenshot 1000 may include a number of tabs 1032 or other user manipulable features (e.g., drop down menus) that allow a user to change the view displayed in the second portion 1012. As shown, the "fund holdings" tab 1032 has been selected to show the matrix 1016 of securities/holdings making upon the selected MMPs. Turning now to FIG. 12, another screenshot 1000" may be displayed upon selecting the "AUM concentration" tab 1032. In this screenshot 1000", the second portion 1012 may include a matrix 1034 of the top "x" (e.g., 25) sponsors of securities of the selected MMPs in terms of currency or value invested in securities held and/or managed by such sponsors. For instance, the matrix 1034 may include a number of columns such as a "sponsor" column 1037, a "% of my portfolio [AUM]" column 1042, an "invested value" column 1038, and/or the like. In this regard, corporate treasurers and other users may readily perceive the influence that one or more particular sponsors have over the assets of the user's AUM (e.g., as a percent of the user's AUM, in currency, etc.).

This screenshot 1000" thus provides another example of protocols and other functionalities discussed previously herein. More specifically, and with brief reference back to FIGS. 7 and 8, once the individual securities/holdings have been obtained from the selected MMPs, the holdings can be grouped or bucketed according to a first metric (in this case, by sponsor), and then the bucketed holdings can be analyzed using a second metric by way of summing the invested values of the holdings held by each sponsor to obtain the total invested value attributed to each of the top x sponsors (e.g., see sponsor buckets 876, 880 in FIG. 8 and invested value column 1038 in FIG. 12). As an added functionality in the screenshot 1000" of FIG. 12, each of the sponsors listed in sponsor column 1037 may be associated with an expand/collapse button 1046 (or other user manipulable feature) that, when manipulated, causes the display or removal of one or more rows 1050 indicating those MMPs from the first portion 1004 that carry holdings in which the particular sponsor manages or is otherwise associated with. For instance, corporate treasurers that want to change investment allocations with respect to one or more highly influential sponsors can observe which of the MMPs such sponsors are associated with (by virtue of underlying holdings/securities) and then appropriately adjust investment amounts with respect to such MMPs.

Figure 14:
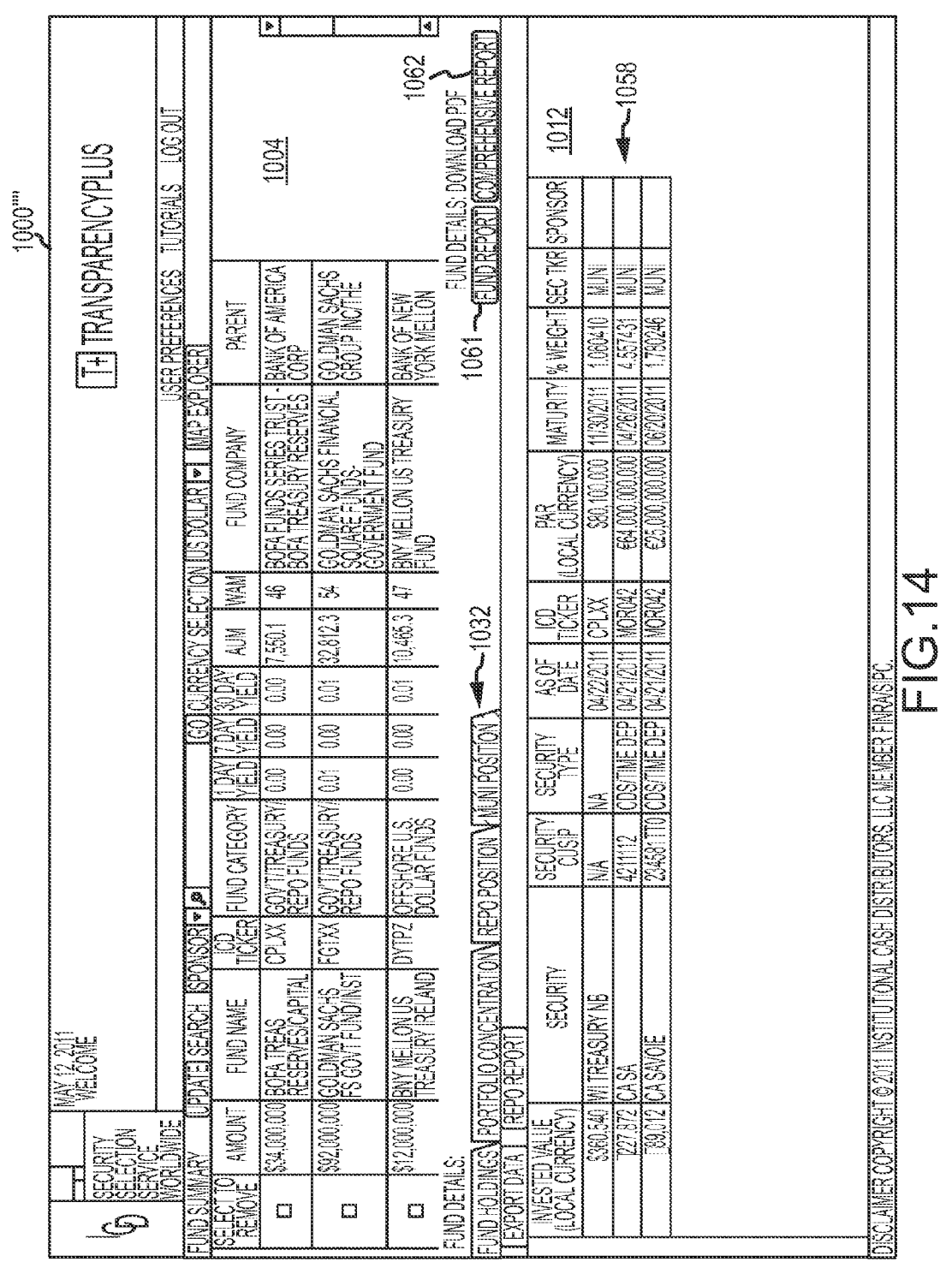

FIGS. 13-14 present additional screenshots 1000''', 1000'''' that may be presented upon the "repo position" and "muni position" buttons 1032 being respectively manipulated. For instance, the screenshot 1000''' may include a matrix 1054 of all holdings of the MMPs indicated in the first portion 1004 which have a "security type" (see column 1055) of "repo" (with similar metrics to those shown in the matrix 1016 of FIG. 10). This screenshot 1000''' may quickly provide a corporate treasurer with a listing of short term repurchase securities in the event that the treasurer wants to evaluate repo position of a corresponding AUM. As another example, the screenshot 1000'''' may include a matrix 1058 that can quickly provide a treasurer an indication of all holdings of the MMPs indicated in the first portion 1004 that have a security type of "muni" in the event the treasurer want to evaluate the municipal bond position of a corresponding AUM. While not shown, other types of buttons 1032 may include positions with respect to specific sponsors, issuers, countries, regions, etc.

Numerous other buttons or user manipulable features may be provided that provide treasurers to other types of analytics to guide their decision-making in relation to corporate treasuries. For instance, and with respect to FIGS. 10-14, the screenshots 1000-1000'''' may include a "fund report" button 1061 that, when manipulated, allows a user to either save or open a report (e.g., PDF, spreadsheet, etc.) for one of the MMPs listed in first portion 1004. While not shown, the report may include detailed information in relation to the individual securities making up the MMP (such as that information shown matrix 1016 of FIG. 10) as well as various types of aggregated information among the securities making up the particular MMP. For instance, all of those securities within the particular MMP classified as ABCP may be aggregated and an indication as to the percentage of MMP made up of ABCP may be provided (e.g., in the form of matrices, graphs, pie charts, etc.). As another example, all of those securities within the particular MMP held or managed by the same sponsor may be aggregated and then the total number of securities held by such sponsors, stock prices of such sponsors, and the like may be graphically displayed on the client device 128.

Figure 15:
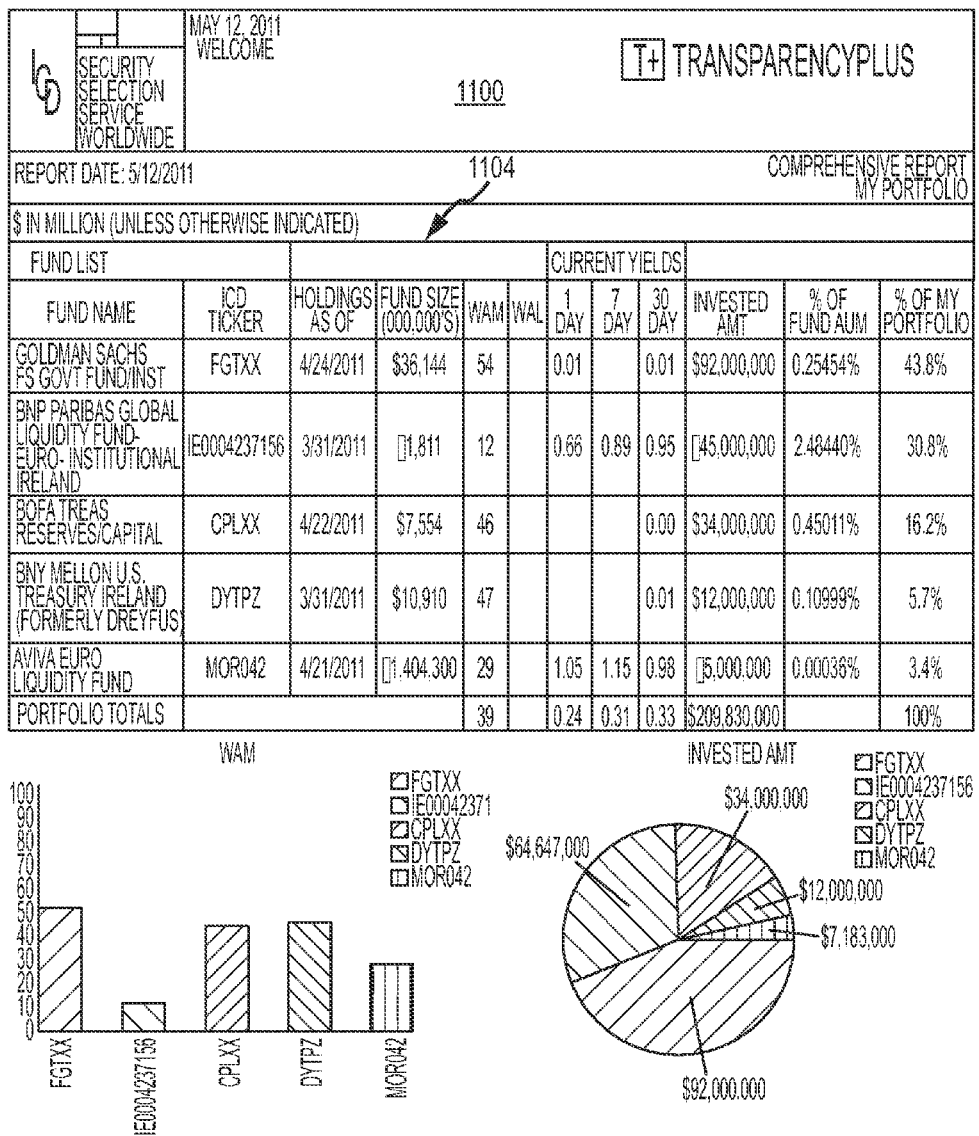

Another button that may be provided in the screenshots 1000-1000'''' is a "comprehensive report" button 1062 that, when manipulated, allows a user to either save or open a comprehensive report (e.g., PDF, spreadsheet, etc.). While a number of sample pages from a comprehensive report will now be described, it should be expressly understood that more, fewer or different pages may be included in the comprehensive report without departing from the scope of the present disclosure. In FIG. 15, one screenshot or page 1100 of the report is shown that provides summary type information for the various MMPs selected for analysis. For instance, this page 1100 may include a matrix 1104 similar to the matrix 1008 of FIG. 10 that indicates each of the selected MMPs as well as corresponding metrics for each of the MMPs (e.g., fund size, yields, WAM, etc.) The page 1100 may also include one or more charts, graphics, etc. providing a visual indication of one or more of the metrics shown in the matrix 1104 (e.g., WAM, invested amount, etc.).

Turning to FIG. 16, another page 1108 of the report may include a matrix 1112 providing a sector analysis of the various selected MMPs. For instance, the various columns of the matrix 1112 may represent sector such as ABCP, commercial paper (CP), credit default swaps (CDS), Repo, and the like. Furthermore, the various rows of the matrix 1112 may represent the selected MMPs, and may be segmented in numerous manners such as by percentage of each MMP represented by each of the various sectors, currency value of each MMP represented by each of the various sectors, changes in the aforementioned values since a particular time period (e.g., a last update, last month, last year, etc.). Each of the segments may also include a "combined" row that provides an indicate of the overall portion of the selected MMPs represented by each of the various sectors, for example, in percentage terms, currency values, and the like. While not shown, additional pages may be included that graphically depict the various metrics presented in the matrix 1112 (e.g., via pie charts, bar graphs, and the like).

In FIG. 17, another page 1116 of the report may include a matrix 1120 similar to the matrix 1034 shown in FIG. 12 including a listing of the top "x" sponsors (e.g., in terms of currency invested in securities held or managed by such sponsors, not all have been shown in the interest of clarity). However, this matrix 1120 may also include a portion 1124 that provides a credit rating summary (e.g., obtained from Moodys, S&P, etc.) for each of the sponsors. Thus, instead of relying merely on ratings of the selected MMPs to guide corporate treasury investment decisions, corporate treasurers can also analyze the ratings of the sponsors that hold or manage the securities making up the MMPs to provide such treasurers with more rich and fine grained information for use in gauging credit exposure.

FIGS. 18-20 present additional pages 1128, 1132, 1136 that may be provided within the comprehensive report for use by treasurers and the like. For instance, page 1128 may include a matrix 1140 that provides a general financial summary of each of the top x sponsors (e.g., market cap, balance sheet info, capital adequacy) irrespective of the particular amounts invested in each of the MMPs and thus their corresponding securities held or managed by the top x sponsors. Such information may be important to supplement other sponsor information (e.g., credit ratings) in the process of making corporate investment decisions. Page 1132 in FIG. 19 may include a matrix 1144 that provides a stock summary for each of the top x sponsors (e.g., current stock price, changes in stock price over the past week, year, etc.) as well as averages over all of the sponsors. Page 1136 in FIG. 20 may include a matrix 1148 that provides a credit default swap (CDS) summary for those sponsors holding or managing 5-year CDS (e.g., prices, change in prices, averages, etc.).

As discussed previously, the present disclosure may also incorporate the use of one or more best practices, established or external guidelines, internal guideline and the like to ensure that MMPs invested in by one or more actual or hypothetical corporate money market AUMs comply with such best practices and guidelines. As will be discussed below, not only can the tools of the present disclosure allow a corporate treasurer or other user to set or adjust one or more of such guidelines and obtain a visual indication as to whether current allocations fall within such guidelines, but the tools may also allow such treasurers to fine tune one or more AUM parameters (e.g., amounts invested in MMPs, redemptions) "on the fly" and automatically receive an updated indication as to any changes in compliance with such guidelines. Furthermore, the tools may also adjust and react according to changing market conditions (e.g., changes in sponsor credit ratings, changes in securities held by MMPs) and provide treasurers with updated indications of compliance (e.g., even if the treasurer has not fine-tuned any AUM parameters). In this regard, the tools can react to both customer-driven and market-driven changes in financial AUM metrics.

Figure 21:
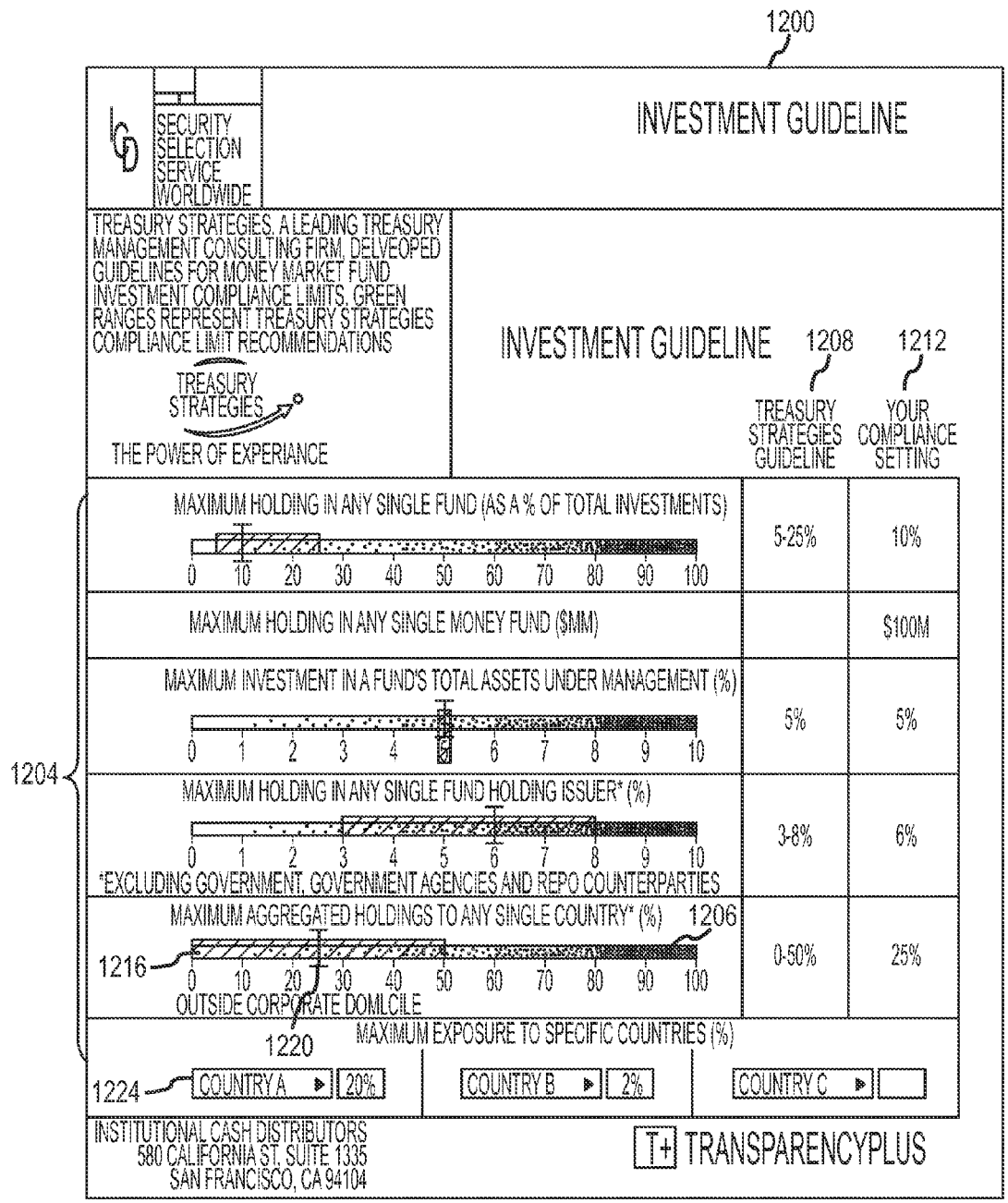
FIGS. 21-22 illustrate screenshots of the FIP portal discussed in relation to FIGS. 9-14 that may be used to monitor compliance with one or more internal/external standards and/or industry best practices guidelines.

With reference now to FIG. 21, another screenshot 1200 of the MMP portal 198 is illustrated that allows corporate treasurer or a user to establish one or more guideline values or ranges for one or more metrics of the user's AUM that can be used by the treasurer to ensure compliance with various internal standards and/or best practices. While not shown, the screenshot 1200 may be appropriately accessible from one or more of the previously discussed screenshots (or other screenshots) of the MMP portal 198 (e.g., via a "user preferences" or other button 926 in screenshot 900 of FIG. 9). Users may establish different sets of guidelines and/or thresholds for different AUMs, accounts, and the like.

The screenshot 1200 may include a number of analysis vectors 1204, each of which may present a range of values of a particular AUM metric. Representative AUM metrics to be monitored may include, but are not limited to, a) a maximum net asset value of any single MMP as a percentage of net asset value of the financial AUM, b) a maximum net asset value in any single MMP in terms of at least one monetary unit (e.g., U.S. Dollars, Euros, etc.), c) a maximum net asset value of holdings under management in any single MMP as a percentage of the net asset value of other holdings in the single MMP, d) a maximum holding in any single holding issuer or sponsor as a percentage of net asset value of the AUM, e) a maximum net asset value of holdings to any single country as a percentage of the net asset value of holdings to other countries, f) maximum holding in any single MMP family, and the like.

In one arrangement, each vector 1204 may include a line or scale 1206 of values (e.g., numbers) and at least one of an external guideline range indication 1216 and an internal threshold indication 1220 which may be overlaid onto or otherwise incorporated with the scale 1206 to provide a visual indication of such guidelines in relation to a range of values that the various metrics may attain. Of course, it is envisioned that both of the internal and external indications 1220, 1216 could be in the form of either a range (as external indication 1216 is currently shown) or a threshold (as internal indication 1220 is currently shown), or the external indication 1216 could be in the form of a threshold and the internal indication 1220 could be in the form of a range.

In any case, one or both of the indications 1216, 1220 can be manipulable, such as by clicking or tapping on the indications 1216, 1220 and dragging the indications 1216, 1220 to a desired location on the scale 1206. Alternative or additionally, the screenshot 1200 may include an external guideline column 1208 and an internal threshold column 1212, each of which includes a number of cells for numerically displaying the particular guidelines and/or thresholds selected for each of the vectors 1204. In one arrangement, the cells of the columns 1208, 1212 may be automatically populated with the various guidelines and ranges selected on the scales 1206 of the various vectors 1204. In another arrangement, the cells of the columns 1208, 1212 may be manipulable and the indications 1216, 1220 on the scales 1206 of the vectors 1204 may automatically adjust to the entered values. In a further arrangement, either the scales 1206 or the columns 1208, 1212 may be present, but not both. In some arrangements, the screenshot 1200 may include one or more cells 1224 corresponding to a maximum percentage exposure of the AUM to one or more specific countries (e.g., as measured by the domicile nations of the sponsors of the securities of the MMPs of the AUM, see world map 1030 in FIG. 11).

Figure 22:
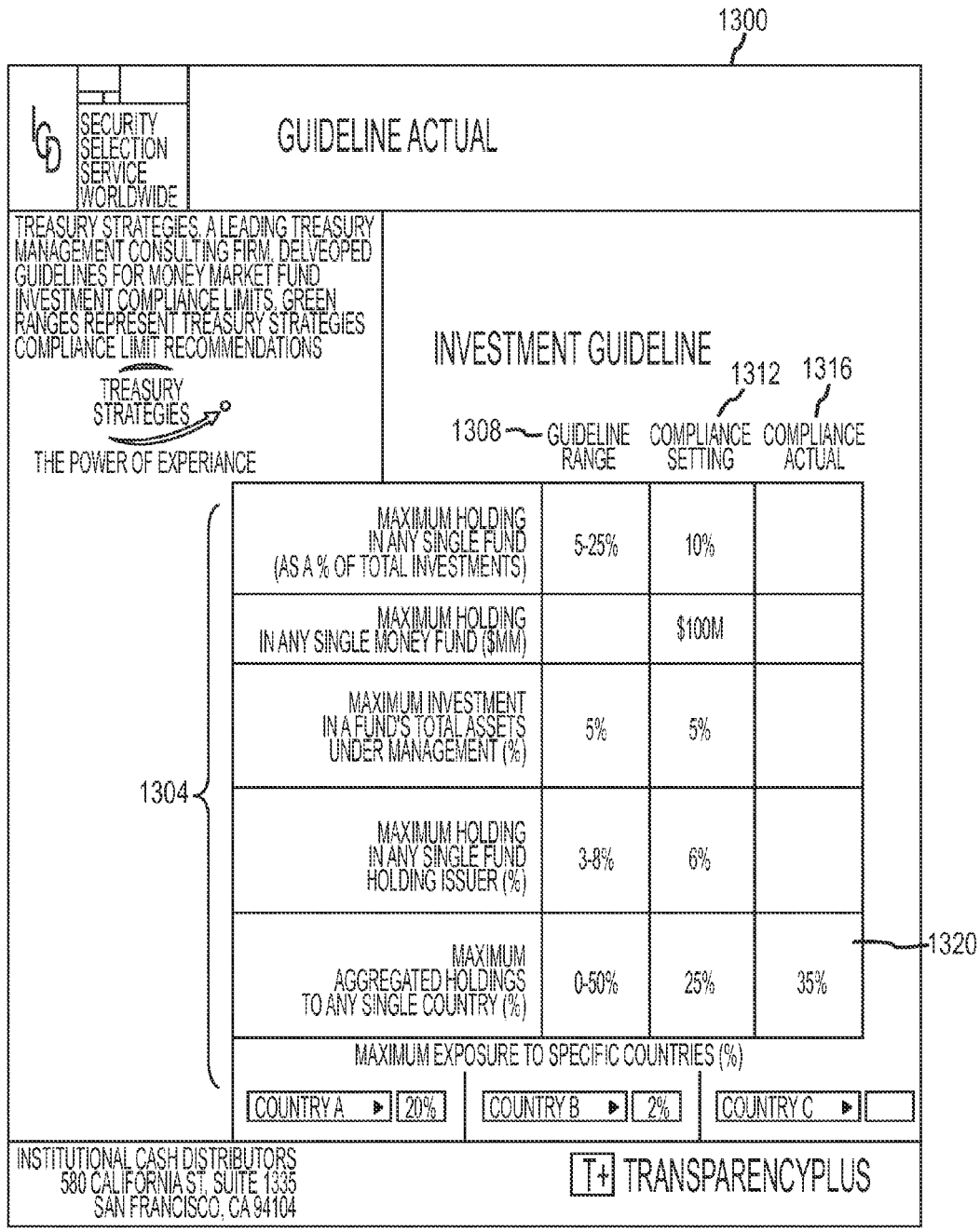

Regardless of the specific form of the screenshot 1200, the analysis module 158 may be operable to a) determine or otherwise obtain the value of each of the metrics of the vectors 1204 for one or more actual or proposed accounts or AUMs, b) compare or obtain a comparison of the determined values against the guideline ranges and/or threshold values selected by the user, recommended by any best practices and/or mandated by law (e.g., SEC regulations), and c) provide a visual indication as to how the determined values relate to the guideline ranges and/or threshold values. Turning now to FIG. 22, another screenshot 1300 is illustrated that generally provides a treasurer or other user a visual indication of whether one or more current or what-if type accounts and/or AUMs comply with one or more guidelines or thresholds discussion in relation to FIG. 21. The screenshot 1300 may be presented to a user in any appropriate manner such as in the form of a pop-up window in one or more of the screenshots of FIGS. 9-14 (e.g., upon a user clicking a "compliance" button), as a page in the comprehensive report of FIGS. 15-20, as part of a separate report, etc. In one arrangement, a user may be able to create a comprehensive report including an analysis of one or more current accounts and/or AUM in addition to an analysis of one or more sample or what-if type accounts or AUMs. As an example, information from the screenshot 1300 (or its equivalent) for each of the current and what-if type accounts or AUMs may be presented side by side to allow treasurers to quickly gauge compliance of such accounts or AUMs (or lack thereof) and to institute corresponding changes in such accounts or AUMs to bring such into compliance with the guidelines and/or thresholds. For instance, current and what-if accounts or AUMs may respectively represent "before and after" compositions in relation to a particular proposed transaction or set of transactions for analytical use by corporate treasurers.

As shown, the screenshot 1300 may include a number of vectors 1304 corresponding to those from FIG. 21 in addition to an external guideline column 1308 and an internal threshold column 1312 also corresponding to those from FIG. 21. This screenshot 1300 may also include a "compliance actual" column 1316 including a number of cells that may be automatically populated (e.g., upon access of the screenshot 1300) with an indication of a value of the particular vector metric for the current and/or what-if accounts and/or AUMs. For instance, and with reference back to FIG. 11, the maximum aggregated holdings to any single country of the particular AUM or account represented in FIGS. 9-20 is 35% to France. In this regard, the analysis module 158 and/or MMP portal 198 may populate cell 1320 in screenshot 1300 with a value of 35%.

Advantageously, a treasurer may be able to quickly compare the actual value of the particular metric of the current and/or what-if account or AUM (here, 35%) to a guideline range (here, 0-50%) and/or internal threshold or compliance setting (here, 25%) to determine whether the account or AUM complies with such guidelines or thresholds, the relative degree to which the current or what-if account or AUM complies or does not comply with the guidelines or thresholds, etc. As touched on previously, market-driven events may cause an account or AUM to fall in and/or out of compliance with such guidelines and thresholds over time (e.g., even without a treasurer changing AUM or account allocations).

In any event, and upon determining or perceiving that the actual maximum aggregated holdings to France is 10% out of compliance with the internal threshold, a treasurer may be able to appropriately adjust MMP holdings and/or invested amounts of the account or AUM and obtain an updated version of screenshot 1300 to determine the impact that the proposed change had on the guidelines or thresholds. As just one example, the treasurer may return to screenshot 1000 in FIG. 10 and perform a search of MMPs for the country "France" (e.g., using drop-down menu 1031 and search cell 1030) to identify those MMPs of the account or AUM having large portions of holdings associated with France. Upon such identification, the treasurer could send a proposed transaction to the MMP portal 198 that reduces the invested amounts in any of such MMPs and/or increases the invested amounts in MMPs having underlying holdings associated with other countries.

Thereafter, the analysis module 158 may be operable to reanalyze the particular metric to determine whether it is still out of compliance with the guideline or threshold. For instance, the analysis module 158 may be able to perform a second or subsequent instance of analyzing the maximum aggregated holdings to any single country and again compare the determined value to the threshold or guideline. It should be understood that the analysis module 158 may take into account two or more proposed trades or transactions (e.g., purchasing additional shares in two different MMPs and selling shares in a third MMP) as part of determining whether the one or more vector metrics are in or out of compliance and/or a relative level of compliance with one or more guidelines or thresholds.

In some arrangements, the numerical values that populate the cells of the compliance actual column 1316 may be appropriately colored or textured to indicate that the account or AUM is or is not in compliance with the particular vector's metric. For instance, the value may be colored green to indicate compliance and red to indicate non-compliance. Additional colors may be incorporated to indicate varying levels of compliance or non-compliance. In another arrangement, a corporate treasurer or other party (e.g., corporate CEO) may be able to mandate compliance with one or more of the vectors 1204, 1304 such that the treasurer would be unable to complete any transaction, trade or reallocation of MMPs in relation to an account or AUM if doing so would cause the account or AUM to fall out of compliance with one or more of the vectors.

For instance, upon the analysis module 158 determining that a potential trade would cause non-compliance with one or more of the vector metrics (e.g., would cause the maximum holding in any single fund as a percent of total investments to be greater than an internal threshold), a button or other feature that the user would otherwise manipulate to complete a trade or transaction may be grayed out or otherwise made non-usable to prevent the trade or transaction from going through. In another arrangement, the treasurer or other user may receive any appropriate messages or alerts (e.g., email, text message, pop-up windows) when a customer and/or market-driven event or change (e.g., change in holdings by a MMP manager) would take an account or AUM out of compliance with one or more of the guidelines or thresholds.

It is also envisioned that the various internal/external guidelines/thresholds disclosed herein may be used as part of a "backward" analysis. More specifically, a treasurer or other user may be able to specify one or more guidelines or thresholds (e.g., using a tool similar to that shown in screenshots 1200, 1300) for various metrics, and then the analysis module 158 may be able to recommend a number of investments or transactions to make to obtain an account or AUM that is compliant with the selected guidelines and/or thresholds. For instance, the analysis module 158 may appropriately retrieve and/or analyze MMP and related holding data stored in MMP data store 166 of server 114 (see FIG. 1).

In one arrangement, the list of MMPs and/or other investments from which the analysis module 158 may make one or more recommendations may be a smaller or more limited set than all of the MMPs and/or other investments in the MMP data store 166 of server 114. For instance, a treasurer may be able create a smaller list of preferred MMPs, and then the analysis module 158 may be able to propose a number of sets of AUM positions (e.g. a first set including $20 million invested in $MMP_1$ and 45 million invested in $MMP_4$ and a second set including $11 million invested in $MMP_1$ and $54 million invested in $MMP_5$) from the created list, each of which would include metrics that are compliant with the thresholds. In another arrangement, treasurers may be able to limit recommendations to one or more pre-set or default groups of MMPs (e.g., by ratings, total asset value etc.). In a further arrangement, a treasurer may be able to specify one or more positions for a particular percentage of an AUM value, and then have the analysis module 158 provide recommended sets of positions for the remaining portion of the total AUM value.

The various system diagrams, data structures, protocols and screenshots, and the like disclosed herein are only presented for exemplary purposes and should not be seen as limiting the present disclosure in any regard. Rather, such diagrams, structures, protocols and screenshots are only meant to assist the reader in understanding one manner of implementing the teachings disclosed herein on one or more computer systems. Similarly, the various manners of accessing various system functionalities (e.g., clicking on a particular drop down menu) disclosed herein do not limit such tools and functionalities to the particular manners of access discussed or even limiting such modules and functionalities to use with any manners of access at all. Rather, these manners of access have only been shown as examples to assist the reader in understanding how one may access such features on a user interface. Other manners of access to the various modules and functionalities are also envisioned and encompassed within the scope of the various embodiments.

Furthermore, embodiments disclosed herein can be implemented as one or more computer program products, i.e., one or more modules of computer program instructions encoded on a computer-readable medium for execution by, or to control the operation of, data processing apparatus. For example, the various modules, builders, portals, etc. utilized by the server 114 of FIG. 1 to gather MMP data, building database, conduct analyses, allow for the presentation of such analyses on a display, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The system 110 may encompass one or more apparatuses, devices, and machines for processing data, including by way of example a programmable processor, a computer, or multiple processors or computers. In addition to hardware, the system 110 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide the various artifact rights management processes disclosed herein) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes, logic flows and protocols described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In different embodiments, system 110 (i.e., the server 114, the client devices 128, and the like) may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (e.g., via the screenshots shown in FIGS. 9-22), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in providing aggregated investment information for fixed income products (FIPs), each of said FIPs having holdings of one or more of the following types: commercial paper, asset-backed commercial paper, repurchase agreements, short-term bonds, floating rate notes, variable rate demand notes, and other FIPs, the method comprising:
   a) identifying a set of FIPs to be supported by a computer-based FIP information aggregation system;
   b) for individual FIPs of the set of supported FIPs, and with a processor;
      i) determining a list of different FIP descriptors for the FIP associated with different information sources;
      ii) associating FIP descriptors of the FIP descriptor list with a standardized FIP descriptor for use in the computer-based FIP information aggregation system; and
      iii) acquiring a list of holdings that are held by the FIP, wherein the list of holdings is made accessible at least pursuant to applicable disclosure regulations governing the FIP;
   c) for individual holdings of the FIPs to be supported by the computer-based information aggregation system; and with the processor;
      i) determining a list of different holding descriptors for the holding associated with different information sources;
      ii) associating holding descriptors of the holding descriptor list with a standardized holding descriptor for use in computer-based FIP information aggregation system; and
      iii) determining a list of attributes to be supported for the holding by the computer-based FIP information aggregation system;
   d) for attributes to be supported by the computer-based FIP information aggregation system, and with the processor;
      i) identifying items of holding information that pertain to the attribute, where different items of pertinent holding information for a given attribute are associated with different sources of information, said different items of pertinent holding information differing with respect to at least one of the descriptor and content; and
      ii) providing rules for using the different types of pertinent holding information to generate standardized attribute information for use by the computer-based FIP information aggregation system; and
   e) storing in a data structure of said computer-based FIP information aggregation system, information indexed to the standardized FIP descriptor of individual FIPs of the set of supported FIPs, said information including:
      i) the list of different FIP descriptors for the FTP;
      ii) the holdings of the FIP identified by the standardized holding descriptors for the holdings; and
      iv) standardized attribute information for the holdings of the FIP.

2. The method of claim 1, wherein a first holding descriptor of a first holding of a first FIP is different from a second holding descriptor of a second holding of a second FIP, and wherein after the step of associating holding descriptors, the standardized holding descriptor of the first holding is the same as the standardized holding identifier of the second holding.

3. The method of claim 1, further comprising:
   aggregating, for each FIP, attribute information for each of its respective holdings;
   associating the aggregated attribute information with the standardized FIP descriptor for the FIP in the data structure.

4. The method of claim 3, wherein the attribute information for each holding comprise at least one of time until maturity, one or more types of yields, and value of holdings of the FIP, in currency, and wherein the aggregating comprises:
   manipulating the metrics to obtain at least one of a weighted average maturity (WAM), one or more types of average yields, and a total assets under management for each FIP.

5. The method of claim 1, wherein the attribute information for each holding comprises at least one of a category of holding, an issuer of the holding, a sponsor of the holding, a domicile nation or region of a sponsor or issuer of the holding, and a financial sector of the holding.

6. The method of claim 5, wherein the category of holding comprises one of treasury debt, government agency debt, variable rate demand note, other municipal debt, financial company commercial paper, asset backed commercial paper, other commercial paper, certificate of deposit, structured investment vehicle note, other note, treasury repurchase agreement, government agency repurchase agreement, other repurchase agreement, insurance company funding agreement, investment company, and other instrument.

7. The method of claim 1, further comprising:
   receiving one or more FIP descriptors for a plurality of FIPs of one or more assets under management (AUM);
   in response to the receiving, obtaining, from the data structure, information about each of the FIPs of the AUM of a given investor; and
   presenting the obtained information on a display, wherein the obtained information for each FIP comprises at least some of the attribute information for each of a number of holdings held by the FIP.

8. The method of claim 7, wherein the method further comprises:
   collectively executing analytics on the attribute information of the holdings of the AUM.

9. The method of claim 8, wherein the attribute information for each of the holdings includes quantification information defining a position in the holding and the collective analytics execution comprises:
   aggregating quantification information among holdings of the AUM having at least one of a common standardized holding identifier, sponsor, issuer and domicile nation.

10. The method of claim 1, wherein the FIP descriptor comprises at least one of a ticker symbol, an International Securities Identification Number (ISIN), a Committee on Uniform Securities Identification Procedures (CUSIP) number, and a Stock Exchange Daily Official List (SEDOL) identifier.

11. The method of claim 1, wherein the set of FIPs is obtained from a first source, and wherein each list of holdings is obtained from a source different than the first source.

12. The method of claim 11, wherein at least one of said lists of holdings is obtained from a website administered by a respective FIP different from the first source, and wherein at least some of the attribute information for each of the holdings is obtained from another source different than the first source and websites administered by the FIPs.

13. The method of claim 1, further comprising:
repeatedly performing said step of storing standardized attribute information according to a predetermined schedule.

14. A system for use in providing aggregated investment information for fixed income products (FIPs), each of said FIPs having holdings of one or more of the following types: commercial paper, asset-backed commercial paper, repurchase agreements, short-term bonds, floating rate notes, variable rate demand notes, and other FIPs, the system comprising:
a processor; and
a memory logically connected to the processor and comprising a set of computer readable instructions that are executable by the processor to;
a) identify a set of FIPs to be supported by a computer-based FIP information aggregation system;
b) for individual FIPs of the set of supported FIPs;
   i) determine a list of different FIP descriptors for the FIP associated with different information sources;
   ii) associate FIP descriptors of the FIP descriptor list with a standardized FIP descriptor for use in the computer-based FIP information aggregation system; and
   iii) acquire a list of holdings that are held by the FIP, wherein the list of holdings is made accessible at least pursuant to applicable disclosure regulations governing the FIP;
c) for individual holdings of the FIPs to be supported by the computer-based information aggregation system;
   i) determine a list of different holding descriptors for the holding associated with different information sources;
   ii) associate holding descriptors of the holding descriptor list with a standardized holding descriptor for use in computer-based FIP information aggregation system; and
   iii) determine a list of attributes to be supported for the holding by the computer-based FIP information aggregation system;
d) for attributes to be supported by the computer-based FIP information aggregation system;
   i) identify items of holding information that pertain to the attribute, where different items of pertinent holding information for a given attribute are associated with different sources of information said different items of pertinent holding information differing with respect to at least one of the descriptor and content; and
   ii) provide rules for using the different types of pertinent holding information to generate standardize attribute information for use by the computer-based FT information aggregation system; and
e) store in a data structure of said computer-based FIP information aggregation system, information indexed to the standardized HP descriptor of individual FIPs of the set of supported FIPs, said information including:
   i) the list of different FIP descriptors for the FIP;
   ii) the holdings of the FIP identified by the standardized holding descriptors for the holdings; and
   iii) standardized attribute information for the holdings of the FIP.

15. The system of claim 14, wherein the memory comprises computer readable instructions that are executable by the processor to:
receive descriptors for a plurality of FIPs associated with at least one account under management (AUM);
first use the received descriptors to obtain from the data structure a listing of descriptors for a plurality of holdings that is respectively held by the FIPs of the AUM;
second use the descriptors to obtain from the data structure attribute information related to the FIPs and their respective holdings; and
provide an output based on the attribute information.

16. The system of claim 15, wherein the memory comprises computer readable instructions that are executable by the processor to:
group two or more holdings according to a first attribute;
perform an analysis on the grouped holdings using a second attribute different than the first attribute; and
provide an output based on the results of the analysis.

17. The system of claim 16, wherein the first attribute comprises at least one of a sponsor, issuer, domicile nation and category of the two or more grouped holdings.

18. The system of claim 16, wherein the first attribute comprises the descriptors of the holdings, and wherein the performing the analysis comprises:
aggregating second attribute information of holdings of the AUM that are identified by a common descriptor.

19. The system of claim 16, wherein the second attribute comprises a holding value in currency or as a percentage of portfolio value, and wherein the performed analysis comprises:
combining second attribute information of the two or more grouped holdings to obtain a measure of the second attribute.

20. The system of claim 16, wherein the memory comprises computer readable instructions that are executable by the processor to:
determine whether the results of the analysis comply with at least one standard or guideline related to the analysis; and
provide an output based on the determination.

21. The processing platform of claim 20, wherein computer readable instructions are further executable by the processor to:
receive a proposed transaction comprising one or more FIPs to be added to and/or removed from the financial portfolio;
perform a subsequent instance of the analysis;
determine whether results of the subsequent instance of the analysis comply with the at least one standard or guideline; and
provide an output based on the determination.

22. The processing platform of claim 21, wherein the subsequent instance of the analysis incorporates at least some information related to the proposed transaction.

* * * * *

UNITED STATES PATENT AND TRADEMARK OFFICE
CERTIFICATE OF CORRECTION

PATENT NO. : 8,700,509 B2
APPLICATION NO. : 13/156234
DATED : April 15, 2014
INVENTOR(S) : Mark A. Heyner et al.

It is certified that error appears in the above-identified patent and that said Letters Patent is hereby corrected as shown below:

In the Claims:

Column 31, Claim 14, line 51, delete "FT", and insert therefor --FIP--.
Column 31, Claim 14, line 55, delete "HP", and insert therefor --FIP--.

Signed and Sealed this
Fifteenth Day of July, 2014

Michelle K. Lee
*Deputy Director of the United States Patent and Trademark Office*